US011958397B2

(12) United States Patent
Richardson

(10) Patent No.: US 11,958,397 B2
(45) Date of Patent: Apr. 16, 2024

(54) CONTAINER TRANSFER SYSTEM

(71) Applicant: Revolutionary Truck Systems, Orange, CA (US)

(72) Inventor: Robert Richardson, Orange, CA (US)

( * ) Notice: Subject to any disclaimer, the term of this patent is extended or adjusted under 35 U.S.C. 154(b) by 0 days.

(21) Appl. No.: 17/119,706

(22) Filed: Dec. 11, 2020

(65) Prior Publication Data

US 2021/0178956 A1 Jun. 17, 2021

Related U.S. Application Data

(60) Provisional application No. 62/947,384, filed on Dec. 12, 2019.

(51) Int. Cl.
*B60P 1/64* (2006.01)
*B60P 1/52* (2006.01)
*B60P 1/44* (2006.01)
*B65G 13/07* (2006.01)
*B65G 39/04* (2006.01)
*B65G 67/20* (2006.01)

(52) U.S. Cl.
CPC .............. *B60P 1/6427* (2013.01); *B60P 1/52* (2013.01); *B60P 1/4471* (2013.01); *B60P 1/649* (2013.01); *B65G 13/07* (2013.01); *B65G 39/04* (2013.01); *B65G 67/20* (2013.01); *B65G 2201/0235* (2013.01)

(58) Field of Classification Search
CPC .......... B60P 1/52; B60P 1/6427; B65G 13/07; B65G 39/04
USPC ........................................ 414/529, 535, 536
See application file for complete search history.

(56) References Cited

U.S. PATENT DOCUMENTS 2,087,846 A * 7/1937 Jahn .......................... B60P 1/52
414/397
2,108,813 A 2/1938 Fitch
(Continued)

FOREIGN PATENT DOCUMENTS

CN 106894322 A * 6/2017 ................ B60P 1/54
EP 0282122 A1 * 9/1988 ................ B60P 1/52
(Continued)

OTHER PUBLICATIONS

International Search Report and Written Opinion for International Application No. PCT/US 2017/063022 dated Mar. 8, 2018.

*Primary Examiner* — James Keenan
(74) *Attorney, Agent, or Firm* — Knobbe Martens Olson & Bear LLP

(57) ABSTRACT

A container transfer system is disclosed. The container transfer system can be installed on a vehicle or a rack. The container transfer system includes a conveyance assembly configured to move a container in a substantially horizontal direction along a longitudinal direction of the conveyance assembly. The conveyance assembly can include a frame comprising longitudinal members and transverse members and a plurality of rollers coupled to the frame. The plurality of rollers can include a first set of drivable rollers configured to be actively driven by a motor and a second set of passive rollers. The container transfer system also comprises a plurality of lift assemblies coupled between chassis rails of the vehicle and the frame of the conveyance assembly configured to raise and lower the conveyance assembly in a substantially vertical direction.

17 Claims, 21 Drawing Sheets

(56) References Cited

U.S. PATENT DOCUMENTS

| | | | |
|---|---|---|---|
| 2,126,800 | A | 8/1938 | Norbom et al. |
| 2,127,058 | A | 8/1938 | Fitch |
| 2,127,481 | A | 8/1938 | Fitch |
| 2,127,482 | A | 8/1938 | Fitch |
| 2,266,789 | A | 12/1941 | Norbom |
| 2,266,790 | A | 12/1941 | Norbom |
| 2,266,791 | A | 12/1941 | Norbom |
| 2,282,352 | A | 5/1942 | Fitch |
| 2,304,115 | A | 12/1942 | Norbom |
| 2,304,117 | A | 12/1942 | Norbom |
| 2,348,019 | A | 5/1944 | Norbom |
| 2,693,286 | A * | 11/1954 | Cocks ............... B60P 1/52 414/535 |
| 3,206,053 | A | 9/1965 | Bridge |
| 3,374,010 | A | 3/1968 | Crockett et al. |
| 3,435,969 | A * | 4/1969 | McCartney et al. ...... B60P 1/54 414/536 |
| 3,567,252 | A | 3/1971 | Zubko |
| 3,612,315 | A | 10/1971 | Blackburn |
| 4,051,959 | A * | 10/1977 | Staff ............... B60P 1/025 414/400 |
| 4,134,345 | A * | 1/1979 | Baldwin ............ B60P 7/132 410/70 |
| RE30,404 | E | 9/1980 | Pereira |
| 4,261,682 | A | 4/1981 | Papps |
| 4,599,040 | A | 7/1986 | Rasmussen |
| 4,715,766 | A * | 12/1987 | Gebhardt ........... B65G 1/0485 414/529 |
| 4,836,735 | A | 6/1989 | Dennehy, Jr. et al. |
| 4,909,378 | A | 3/1990 | Webb |
| 5,169,194 | A | 12/1992 | Yamashita et al. |
| 5,193,968 | A | 3/1993 | Hicks |
| 5,203,670 | A | 4/1993 | Yoneda et al. |
| 5,237,784 | A * | 8/1993 | Ros ................ B60P 1/6427 52/79.5 |
| 5,395,201 | A | 3/1995 | Yamashita et al. |
| 5,467,827 | A | 11/1995 | McLoughlin |
| 5,605,427 | A | 2/1997 | Hammond |
| 6,585,473 | B2 | 7/2003 | Turner |
| 6,652,214 | B1 | 11/2003 | Barry |
| 6,695,561 | B2 | 2/2004 | Barry |
| 6,698,784 | B2 | 3/2004 | Workman |
| 6,935,829 | B2 | 8/2005 | Smith et al. |
| 6,962,473 | B2 | 11/2005 | Scranton et al. |
| 7,074,004 | B2 | 7/2006 | Lockamy et al. |
| 7,228,585 | B1 | 6/2007 | Egland |
| 7,241,100 | B2 | 7/2007 | Lockamy et al. |
| 7,264,437 | B2 | 9/2007 | Lockamy et al. |
| 7,270,511 | B2 | 9/2007 | Lockamy et al. |
| 7,438,515 | B2 | 10/2008 | Barry |
| 7,563,065 | B1 | 7/2009 | Bennett |
| 7,618,224 | B2 | 11/2009 | Barry |
| 8,157,499 | B1 | 4/2012 | Jones |
| 8,306,706 | B2 | 11/2012 | Kim |
| 8,414,245 | B2 | 4/2013 | Johnson et al. |
| 8,434,991 | B1 | 5/2013 | Hacker |
| 8,602,712 | B2 | 12/2013 | Ritson |
| 10,449,886 | B2 * | 10/2019 | Richardson ............ B60P 1/38 |
| 2005/0244256 | A1 | 11/2005 | Barry |
| 2007/0186361 | A1 | 8/2007 | Egland |
| 2013/0011229 | A1 | 1/2013 | Barry |
| 2013/0011230 | A1 | 1/2013 | Barry |
| 2016/0009506 | A1 | 1/2016 | Kelderman |
| 2017/0225602 | A1 | 8/2017 | Corrigan |

FOREIGN PATENT DOCUMENTS

| | | |
|---|---|---|
| GB | 544436 | 4/1942 |
| GB | 1474322 | 5/1977 |
| KR | 20120039769 | 4/2012 |
| NL | 1031370 | 9/2007 |
| WO | WO 2014/203024 | 12/2014 |

* cited by examiner

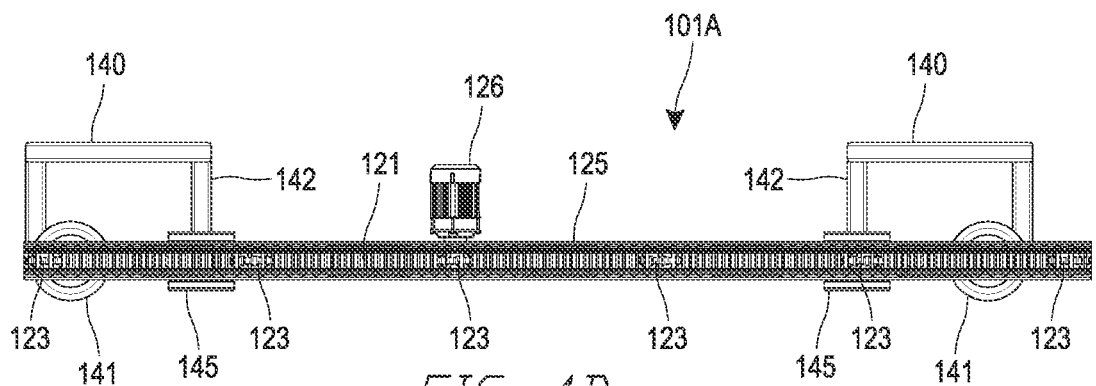
FIG. 4B (Prior Art)
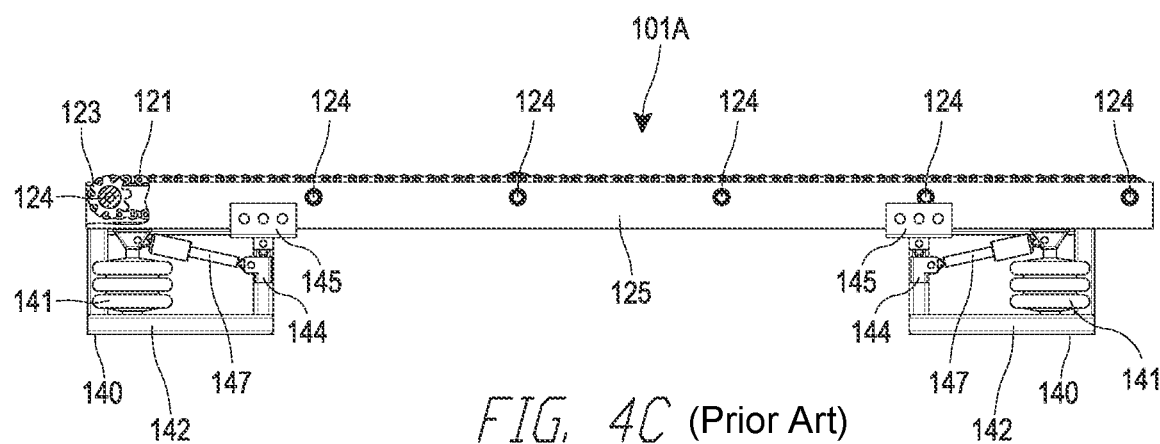
FIG. 4C (Prior Art)
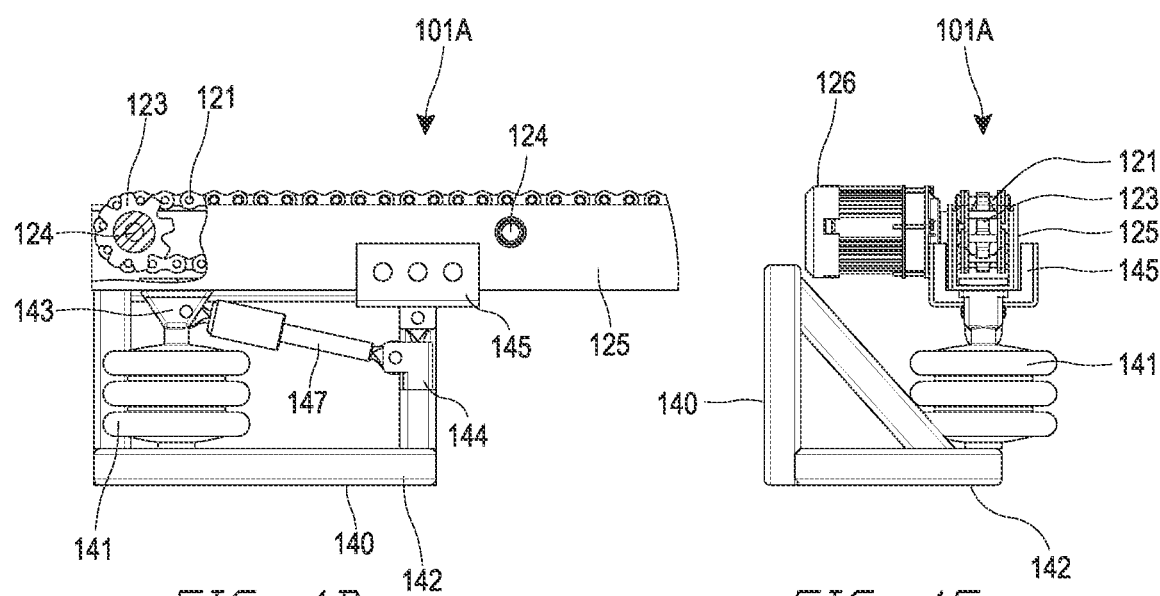
FIG. 4D (Prior Art)
FIG. 4E (Prior Art)

CONTAINER TRANSFER SYSTEM

INCORPORATION BY REFERENCE TO ANY PRIORITY APPLICATION(S)

This application claims priority to U.S. Provisional Application No. 62/947,384, filed Dec. 12, 2019, of which is incorporated herein by reference. Any and all applications for which a foreign or domestic priority claim is identified in the Application Data Sheet as filed with the present application are hereby incorporated by reference under 37 CFR 1.57.

BACKGROUND

Field

This disclosure relates to cargo transport, and, in particular, to systems for transferring containers between transport vehicles.

Description of the Related Art

Traditionally, cargo is transported by one or more vehicles from an origin location to a destination. In some instances, the cargo is loaded on pallets, which are placed into a first transport vehicle by a forklift. In some instances, pallets are not used, and the cargo is loaded directly onto the floor ("floor loaded") of the first transport vehicle.

During transportation, the cargo can be transferred from the first transport vehicle to one or more subsequent transport vehicles. In long haul transfer, the cargo can be transferred, for example, from a train to a truck. As another example, in hub and spoke distribution, cargo can be delivered to a distribution center by a first truck and then divided into one or more second trucks (for example, cross-docked) for delivery to one or more destinations. If the cargo is loaded on pallets, forklifts can facilitate the transfer between transport vehicles. If the cargo is floor loaded, the transfer can be accomplished by manual unloading and loading of cargo. These transfer methods can require additional equipment (such as forklifts) and/or manpower. Additionally, during transfer between transport vehicles, the cargo is exposed to tampering, damage, or loss.

SUMMARY

A container transfer system installed is described herein. The system may be installed on a vehicle or a rack. The container transfer system may include a conveyance assembly configured to move a container in a substantially horizontal direction along a longitudinal direction of the conveyance assembly. The conveyance assembly may include a frame comprising longitudinal members and transverse members, and a plurality of rollers coupled to the frame, wherein each roller of the plurality of rollers is rotatably coupled to the longitudinal members of the frame by bearings attached to the longitudinal members of the frame. The plurality of rollers comprise may include a first set of drivable rollers configured to be actively driven by a motor coupled to the frame, and a second set of passive rollers. The system may also include a plurality of lift assemblies coupled between chassis rails of the vehicle and the frame of the conveyance assembly, each of the plurality of lift assemblies comprising a lift actuator configured to be actuated to raise and lower the conveyance assembly in a substantially vertical direction.

In some embodiments, each of the first set of drivable rollers comprises a sprocket, and a chain is engaged with each of the sprockets and the motor to drive the first set of drivable rollers with the motor. Each of the plurality of lift assemblies can include a bracket comprising a first mounting plate attached to one of the chassis rails of the vehicle and a lift actuator support plate attached to a lower end of the lift actuator, and a frame attachment structure attached to an upper end of the lift actuator, the frame attachment structure further comprising a second mounting plate attached to the frame of the conveyance assembly. The upper end of the lift actuator can be attached to the frame attachment structure with a removable pin configured to be removed to detach the lift actuator from the frame attachment structure. In some embodiments, the frame attachment structure further comprises a rail extending along an axis parallel to an axis of actuation of the lift actuator, the rail slidingly engaged with one or more guides attached to the bracket of the lift assembly. The system the vehicle can include a hydraulic system. The motor can be a hydraulic motor configured to be driven by the hydraulic system of the vehicle. Each of the lift actuators can include a hydraulic ram configured to be driven by the hydraulic system of the vehicle or by an independent power source. The set of drivable rollers may comprise four drivable rollers positioned at a distal end of the conveyance assembly. The plurality of lift assemblies comprises four lift assemblies, each of the four assemblies positioned in one of four corners of the frame of the conveyance assembly. The lift actuator of each of the four lift assemblies can be independently actuated such that longitudinal and transverse tilt of the conveyance assembly can be adjusted to level the conveyance assembly.

In some embodiments, the system further comprises a container positioned on the conveyance assembly. The container can include an enclosure configured for receiving cargo, a pair of container rails attached to a bottom surface of the container, and one or more container support surfaces attached to the bottom surface of the container between the pair of rails. The enclosure of the container may include a first door on a first end and a second door on a second end, the second end opposite the first end. The conveyance assembly can be received between the pair of container rails such that container support surfaces rest on the plurality of rollers. The motor can be configured to drive the set of drivable rollers to convey the container along the longitudinal direction.

The system may also include one or more locking assemblies configured to engage the container to prevent movement of the container when engaged. Each of the one or more locking assemblies can be attached to one of the chassis rails and comprises an actuator configured to actuate a locking pawl that engages a lug on the container. The actuator can include a hydraulic actuator driven by a hydraulic system of the vehicle or an independent power source.

In some embodiments, the vehicle comprises a hydraulic system, the motor comprises a hydraulic motor configured to be driven by the hydraulic system of the vehicle, each of the lift actuators comprises a hydraulic ram configured to be driven by the hydraulic system of the vehicle, and the system comprises hydraulic connectors configured to connect to hydraulic components of a second container transfer system such that the hydraulic components of the second container transfer system can be driven by the hydraulic system of the vehicle. In some embodiments, the second container transfer system is mounted on a rack. The system can include a container configured to be transferred between the container transfer system of the vehicle and the second container transfer system of the rack.

BRIEF DESCRIPTION OF THE DRAWINGS

These drawings depict only several embodiments in accordance with the disclosure and are not to be considered limiting of its scope. In the drawings, similar reference numbers or symbols typically identify similar components, unless context dictates otherwise. The drawings may not be to scale.

FIG. 4B is a top view of one side of the container transfer system of FIG. 4A.

FIG. 4C is a side view of the one side of the container transfer system of FIG. 4B.

FIG. 4D is a detail side view of an end portion of the one side of the container transfer system of FIG. 4B.

FIG. 4E is a front view of the one side of the container transfer system of FIG. 4B.

DETAILED DESCRIPTION

Disclosed herein are container transfer systems and related methods. In some embodiments, the container transfer systems are installed directly on transport vehicles and/or racks and are configured to transfer cargo-loaded containers (or unloaded containers) directly between transport vehicles and/or racks. In some embodiments, the container transfer systems are configured to transfer containers without requiring the use of additional equipment (such as forklifts, cranes, hoists, etc.) and/or dedicated facilities (such as docks, facilities, etc.). In some embodiments, the containers transfer systems transfer containers in a substantially horizontally direction. In some embodiments, because the container transfer systems transfer containers directly between transport vehicles, cargo does not need to be unloaded and reloaded. In some embodiments, this simplifies cargo transfer between vehicles and/or eliminates or mitigates tampering, damage, or loss of the cargo.

These and other features and advantages of the container transfer systems described herein will become more fully apparent from the following description and appended claims, taken in conjunction with the accompanying drawings. Although the drawings illustrate several specific embodiments, these are provided by way of example only and are not intended to be limiting. The features of any of the embodiments illustrated in drawings or described in text throughout this application can be modified, duplicated, removed, and/or combined with features of any other embodiment illustrated or described herein, or as will be apparent to a person of ordinary skill in the art upon consideration of this disclosure.

Figure 1:
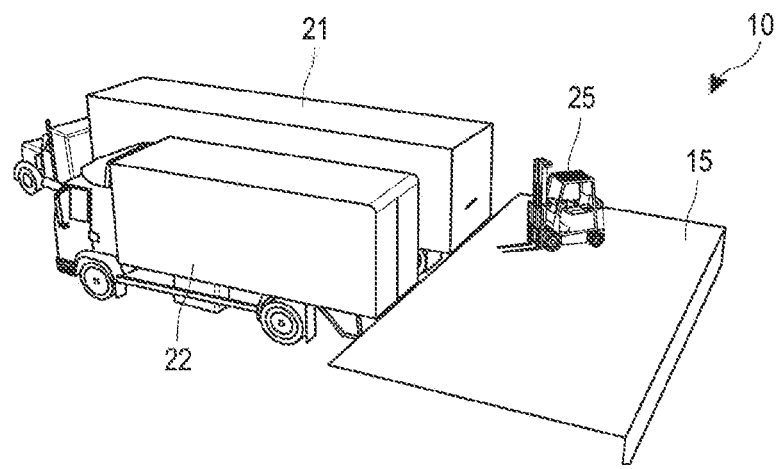
FIG. 1 is a perspective view of an embodiment of a conventional cross-docking site.

FIG. 1 is a perspective view of an embodiment of a cross-docking site 10. The cross-docking site 10 is a location where cargo can be transferred between transport vehicles. In FIG. 1, a first transport vehicle 21 and a second transport vehicle 22 are present at the cross-docking site. As illustrated, the first transport vehicle 21 is a larger semi-truck and the second transport vehicle 22 is a smaller delivery truck. However, the cross-docking site 10 can be used to transfer cargo between many different numbers and types of transport vehicles.

The cross-docking site 10 includes an elevated platform 15. To facilitate cargo transfer, the first and second transport vehicles 21, 22 are backed to the elevated platform 15 such that doors into the cargo area of each are level with the elevated platform 15. In general, the cargo area of each transport vehicle 21, 22 is an enclosed storage space permanently affixed to the transport vehicle itself or a trailer pulled by the transport vehicle. In some instances, the cargo area may be open, such as a flatbed truck or trailer, for example. In some embodiments, a forklift 25 (or other similar device) located on the elevated platform 15 can then transfer pallets loaded with cargo between the first and second transport vehicles 21, 22. If the cargo is floor loaded into the transport vehicles 21, 22, dock workers may transfer the cargo manually.

Figure 2:
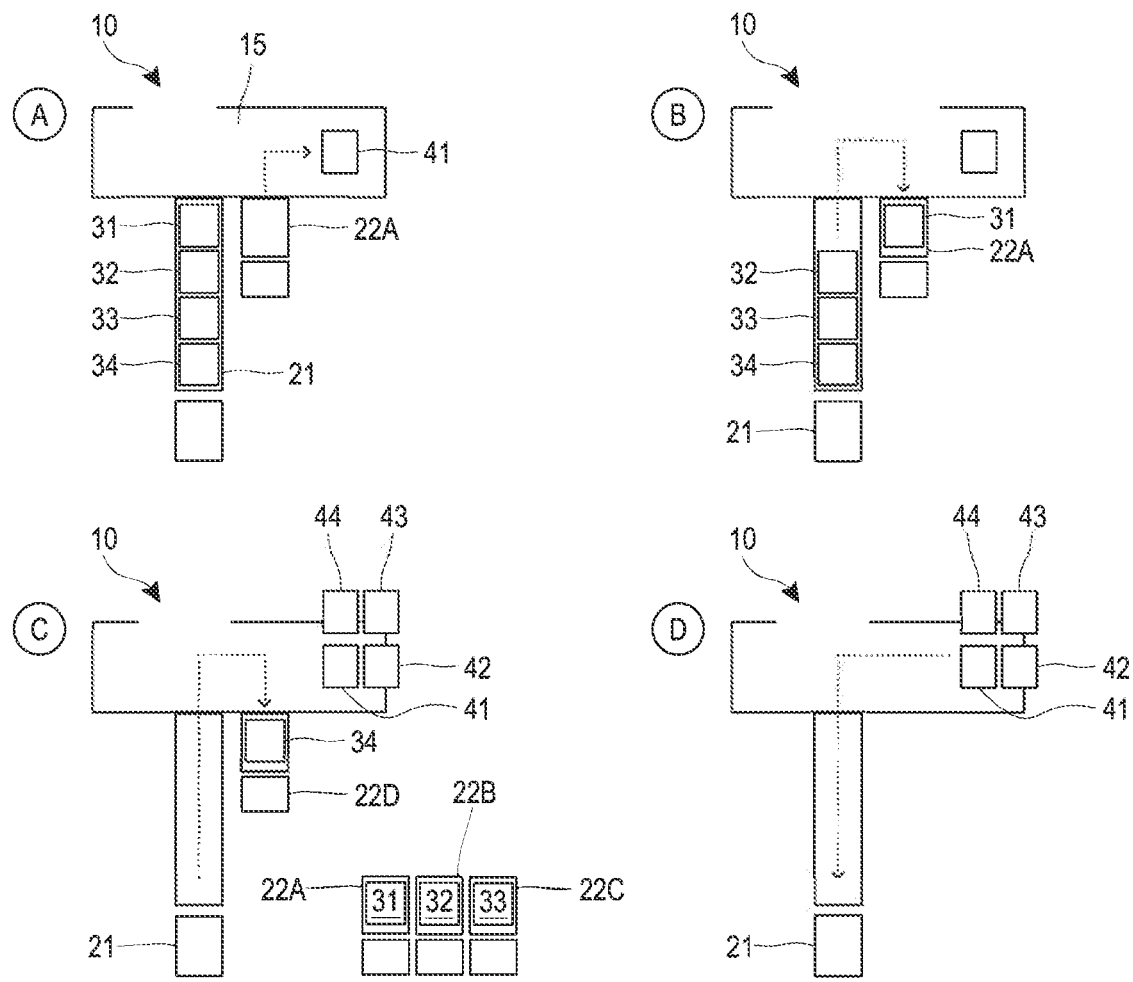
FIG. 2 is a diagram illustrating a simplified embodiment of a conventional cross-docking process.

FIG. 2 is a diagram illustrating a simplified embodiment of a conventional cross-docking process, performed, for example, at cross-docking site 10. In the illustrated embodiment, the process transfers cargo between the first transport vehicle 21 and four second transport vehicles 22a-22d (collectively, transport vehicles 22), although various modifications of the process are possible.

In panel A, the first transport vehicle 21 is backed to the elevated platform 15. The first transport vehicle 21 has been previously loaded with four unit loads 31-34. For ease of description, each unit load 31-34 will be described as including a single pallet loaded with cargo, although, it will be understood that each unit load 31-34 may comprise multiple pallets of cargo, quantities of floor loaded cargo, or cargo loaded into one or more other types of shipping containers. The second transport vehicle 22a is also backed to the elevated platform 15. In the illustrated embodiment, the second transport vehicle 22a is a delivery truck returned from a delivery and is loaded with an empty pallet. The empty pallet 41 can be unloaded from the second transport vehicle 22a by the forklift 25 and stored on the elevated platform 15.

In panel B, the first unit load 31 is transferred to the second transport vehicle 22a, for example, by the forklift 25. Transfer of the first unit load 31 includes removing the first unit load 31 from the first transport vehicle 21 and placing the first unit load in the second transport vehicle 22a. In some instances, transfer of the first unit load 31 can also include storage of the first unit load 31 on the elevated platform 15 or nearby for a period of time.

In panel C, the remaining unit loads 32-34 are transferred to additional second transport vehicles 22b-22d. Empty pallets 42-44 are shown, which have been unloaded from the second transport vehicles 22b-22d. Once loaded, second transport vehicles 22a-22d depart to deliver unit loads 31-34 to their respective destinations. In panel D, empty pallets 41-44 are loaded into the first transport vehicle 21 for return to a distribution center where they can be reloaded with cargo.

The cross-docking site 10 and process described with reference to FIGS. 1 and 2 can present several disadvantages. For one, because the cargo must be removed from the first transport vehicle 21 in order to be transferred to the second transport vehicles 22, it is exposed to tampering, damage, and loss. In some instances, the first and second vehicles 21, 22 are not present at the cross-docking site 10 at the same time. In these instances, cargo may be unloaded from the first transport vehicle 21 and stored on the elevated platform 15 (or elsewhere nearby) until the second transport vehicle 22 arrives and can be loaded. Storage of cargo at the cross-docking site 10 increases the exposure of the cargo to tampering, damage, and loss. Additionally, operation of the cross-docking site 10 can be expensive. For instance, the cross-docking site 10 requires a dedicated property, which can be expensive. Further, operation of the cross-docking site 10 can require expensive machinery, such as forklifts 15, and manpower. Finally, loading and unloading of cargo can take significant time, which can increase cost and decrease shipping speed. Container transfer systems and methods will now be described with reference to FIGS. 3-9, which can, in some embodiments, mitigate or resolve one or more of the above-noted disadvantages.

Figure 3:
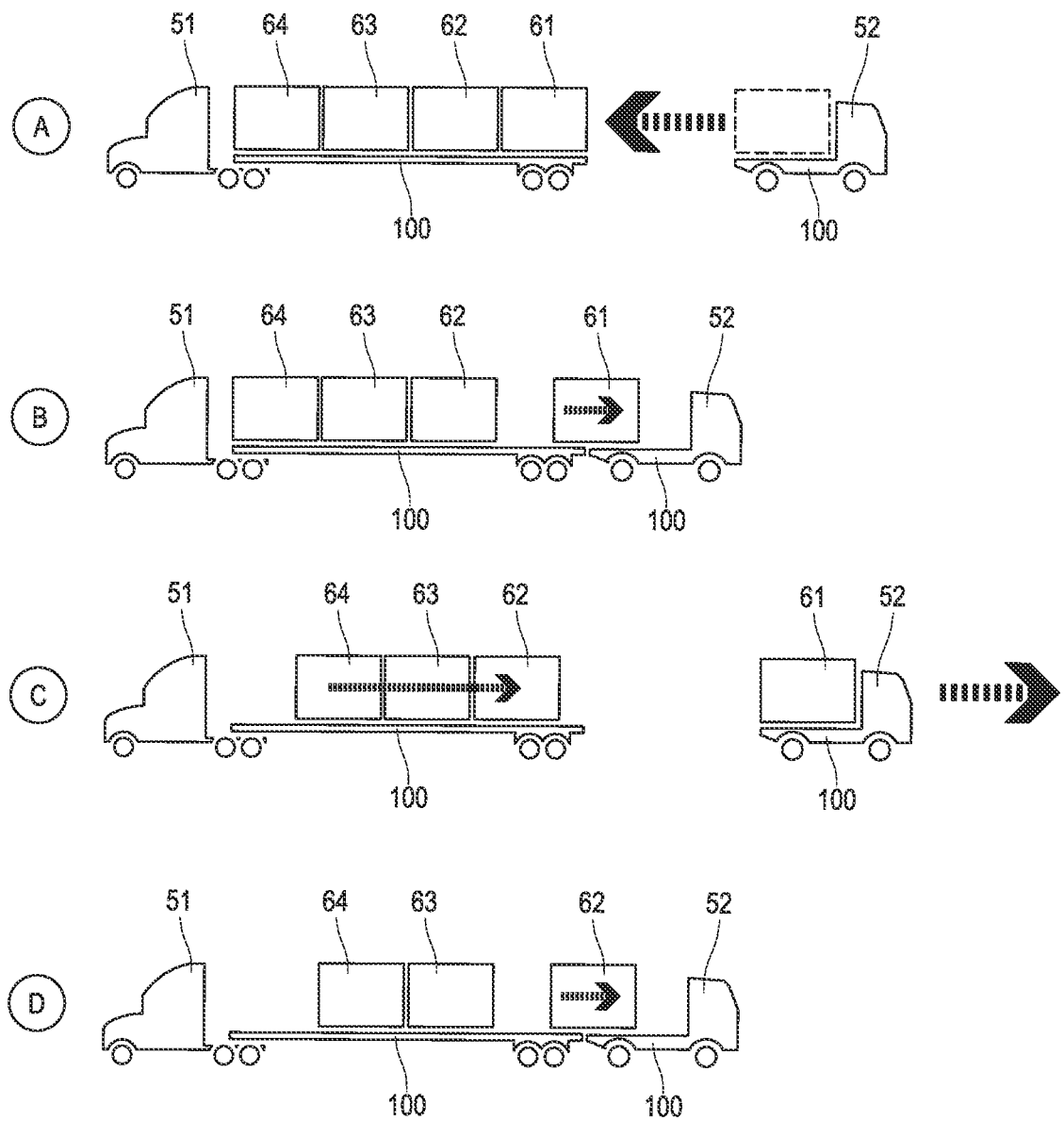
FIG. 3 is a diagram illustrating a simplified view of an embodiment of container transfer between transport vehicles using the container transfer systems described herein.

FIG. 3 is a diagram illustrating a simplified view of an embodiment of container transfer between transport vehicles 51, 52 using the container transfer systems 100 described herein. While not shown in detail in FIG. 3, an embodiment of the container transfer system 100 is shown in FIGS. 4A-4E below.

As shown in panel A of FIG. 3, a first transport vehicle 51 is loaded with four containers 61-64. Each container 61-64 can hold cargo. In some embodiments, the containers 61-64 can be fully enclosed and secured. The containers 61-64 are not permanently attached to the first transport vehicle 51, but rather are supported on a container transfer system 100 of the first transport vehicle 51. A second transport vehicle 52 is also illustrated. The second transport vehicle 52 also includes a container transfer system 100. As illustrated in panel A, the container transfer system 100 of the second transport vehicle 52 is empty (that is, no container is supported on the container transfer system 100, as illustrated by the dashed box). To transfer a container 61 from the first transport vehicle 51 to the second transport vehicle 52, the first and second transport vehicles 51, 52 are backed together, such that the container transfer systems 100 are aligned. In some embodiments, the container transfer systems 100 include features to level and align the two systems. In some embodiments, the first and second vehicles 51, 52 can be backed together in any location, as long as the location allows sufficient space for the maneuvering of the first and second transport vehicles 51, 52. Thus, in some embodiments, transfer of cargo is not limited to occurring only at cross-docking sites and does not require a dedicated cross-docking property.

As illustrated in panel B, the container transfer systems 100 are activated to transfer the container 61 from the first transport vehicle 51 to the second transport vehicle 52. As illustrated, in some embodiments, the transfer of container 61 proceeds in a substantially horizontal direction. In some embodiments, the transfer does not require external machinery, such as forklifts, cranes, hoists, etc. Further, in some embodiments, the container 61 remains closed during transfer, and thus, the cargo is not exposed to tampering, damage, or loss.

Once loaded with container 61, the second transport vehicle 52 can depart to deliver its cargo to its destination, as shown in panel C. As shown in panel D, an additional second transport vehicle 52 can be backed to the first transport vehicle 51 to receive transfer of container 62. This process can be repeated until all of containers 61-64 are transferred.

The transfer process illustrated in FIG. 3 is provides one example, among many, that illustrates the use of the container transfer systems 100 described herein. Numerous modifications of the process are possible. For example, the number of containers each transport vehicle can be configured to hold can be varied. In some embodiments, each transport vehicle can hold one, two, three, four, five, six, or more containers. As another example, the number of containers transferred between each transport vehicle can be varied. While FIG. 1 illustrates transfer of a single container at a time, in some embodiments, one, two, three, four, five, six, or more containers can be transferred together. As yet another example, in some embodiments, the container transfer systems 100 can be installed on other types of transport vehicles. For example, a container transfer system 100 can be installed on a rail car, a trailer, or in the cargo hold of an airplane or ship, among others. As yet another example, in some embodiments, the container transfer systems 100 can be installed on a holding rack, such that a container can be transferred from a transport vehicle to the holding rack and again from the holding rack to a transport vehicle. In the illustrated embodiment, containers are transferred from end to end. In some embodiments, however, containers can be transferred from side to side.

The container transfer systems 100 described herein can be used with many types and sizes of containers. The size, shape, and capacity of the containers can vary without limit and may depend upon the types of items to be transferred. In some instances, this may be cargo containers. In other instances, this may be different types of platforms (e.g., pallets, truck beds, etc.). For example, a single commercial truck may use the container transfer system 100 to shift between being a flatbed truck, to a dump truck, to a cement mixer, etc. As another example, in the case of agricultural equipment, one truck may be used for a variety of implements and accessories. In some embodiments, the cargo containers may be configured to comply with federal size constraints (for example, maximum lengths and widths for use on public roads). In some embodiments, the containers can be fully enclosed. In some embodiments, the containers can be securable (for example, lockable). In some embodiments, the containers can be open, for example, comprising open tops, ends, or sides.

In some embodiments, the container transfer systems 100 described herein provide one or more advantages. For example, in some embodiments, the container transfer systems 100: allow direct transfer of containers of cargo between transport vehicles, allow transfer of cargo at any location, do not require additional equipment or manpower to transfer containers, and/or do not expose (or reduce exposure of) the cargo to tampering, damage, or loss. In some embodiments, the container transfer systems 100 are fully operable by a single person, such as the driver. In some embodiments, the container transfer systems are controllable from within the cab of the transport vehicle. The container transfer system can include a controller allowing a user to manipulate the container transfer system 100, for example, to manually control the height and angle of the system as well as to drive the chain drives. In some embodiments, the system may be automated, and may include laser and proximity sensors that provide inputs to a computerized control system. A detailed embodiment of a container transfer system 100 will now be described with reference to FIGS. 4A-4E.

Figure 4A:
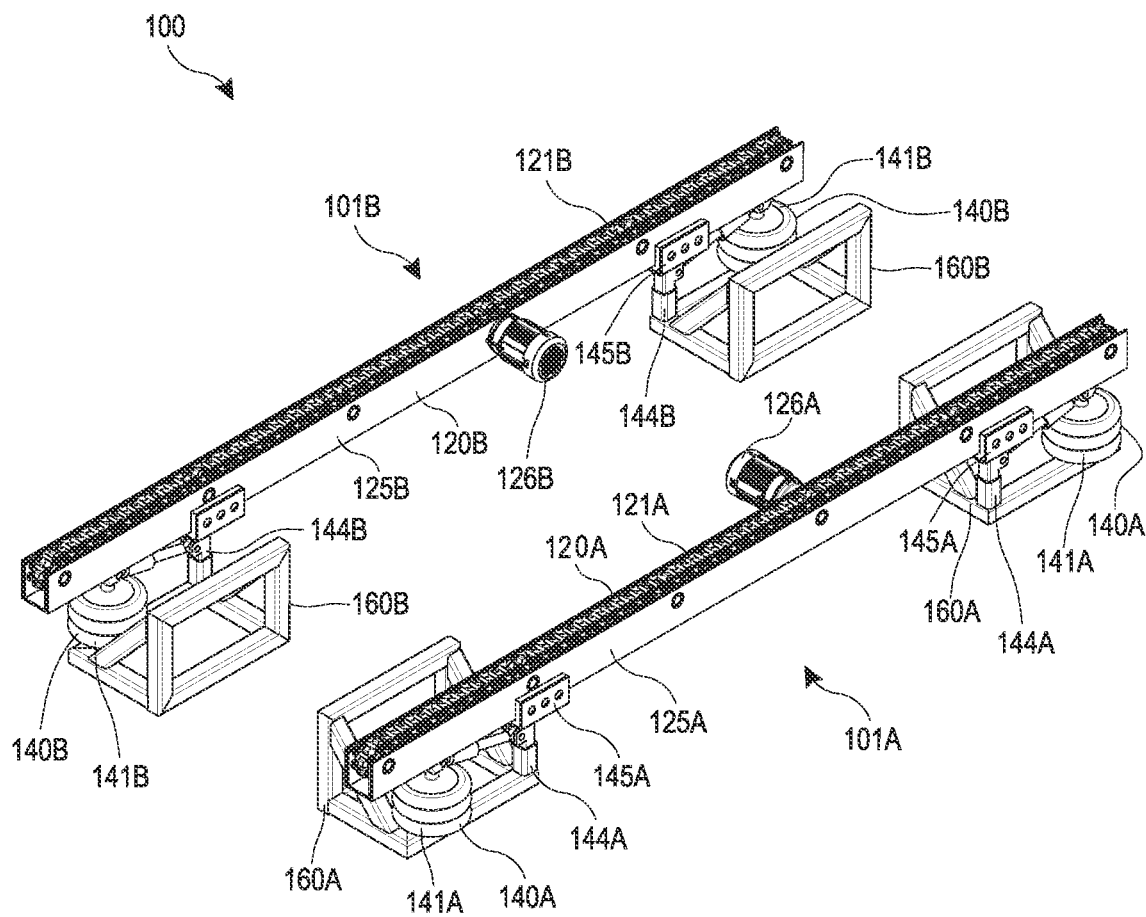
FIG. 4A is a perspective view of an embodiment of a container transfer system.

FIG. 4A is a perspective view of an embodiment of a container transfer system 100. Although shown alone in FIG. 4A, the container transfer system 100 is configured to be mounted to the frame of a truck, trailer, other transport vehicle, or rack as described below (see FIGS. 6A-6B, for example). In the illustrated embodiment, the container transfer system 100 includes two separate assemblies 101a, 101b. As will become apparent from the following description, each assembly 101a, 101b is configured to (1) convey a container backwards or forwards along its length (referred to herein as the horizontal direction) and (2) move up and down vertically.

In the illustrated embodiment, each assembly 101a, 101b includes one conveyance mechanism 120a, 120b. As will be described below, the conveyance mechanism 120a, 120b is configured to convey a container backwards and forwards in the horizontal direction.

Each assembly 101a, 101b also desirably includes two lift mechanisms 140a, 140b. For each assembly 101a, 101b, the two lift mechanisms 140a, 140b support the conveyance mechanism 120a, 120b. In the illustrated embodiment, for each assembly 101a, 101b, a first lift mechanism 140a, 140b is positioned at substantially a first end of the conveyance mechanism 120a, 120b, and a second lift mechanism 140a, 140b is positioned substantially at a second end of the conveyance mechanism 120a, 120b. Although the lift mechanisms 140a, 140b are shown positioned substantially at the ends of the conveyance mechanisms 120a, 120b, this need not be the case in all embodiments. For example, in some embodiments, the lift mechanisms 140a, 140b can be positioned spaced inward from the ends of the conveyance mechanisms 120a, 120b. In some embodiments, for each assembly 101a, 101b, the lift mechanism 140a, 140b are substantially similar to each other. In some embodiments, the lift mechanisms 140a, 140b on one end of the conveyance mechanisms 120a, 120b can be arranged in a mirrored configuration to the lift mechanisms 140a, 140b on the opposite end of the conveyance mechanisms 120a, 120b. In some embodiments, each assembly 101a, 101b includes more than two (for example, three, four, five, or more) lift mechanisms 140a, 140b for each conveyance mechanism 120a, 120b.

As will be described below, the lift mechanisms 140a, 140b are configured to raise and lower the conveyance mechanisms 120a, 120b in the vertical direction, as well as adjust the angle of the conveyance mechanisms 120a, 120b relative to horizontal. In some embodiments, each lift mechanism 140a, 140b is independently controllable so as to allow for independent adjustment of the height of each conveyance mechanism 120a, 120b as well as independent adjustment of the angle of each.

While each lift mechanism desirably 140a, 140b supports an end of a conveyance mechanism 120a, 120b, each lift mechanism 140a, 140b is desirably supported by a mounting frame 160a, 160b. The mounting frames 160a, 160b are configured to be mounting points for installing each assembly 101a, 101b. For example, in some embodiments, the mounting frames 160a, 160b are configured to mount to the frame of a transport vehicle, a rail car, a cargo bay of a boat or airplane, a storage rack, etc. The mounting frames 160a, 160b provide a base for the container transfer system 100. The mounting frames 160a, 160b are configured to provide the structural strength required to carry the weight of the container transfer system as well as any container and load that can be placed thereon. The embodiments of the mounting frames 160a, 160b shown in the figures are provided by way of example only and, in some embodiments, can be varied to conform to the transport vehicle (or other object) to which the container transfer system 100 is to be mounted.

As shown in FIG. 4A, the assemblies 101a, 101b can be positioned in a substantially parallel arrangement. In some embodiments, the assemblies 101a, 101b are substantially mirror images of each other. That is, the assembly 101b can include substantially the same components as the assembly 101a, although in the reversed configuration. Thus, for ease of description, the following discussion of FIGS. 4B-4E will describe the components of the assembly 101a of the container transfer system 100, with the understanding that the assembly 101b includes similar features.

FIG. 4B is a top view of the assembly 101a, and FIG. 4C is a side view of the assembly 101a. FIG. 4D is a detail side view of an end portion the assembly 101a, and FIG. 4E is a front view of the assembly 101a. For simplicity, the components of the assembly 101a numbered in FIGS. 4B-4E do not include reference characters "a" and "b," which have been used previously herein (for example, in FIG. 4A) to refer to the components of the assemblies 101a, 101b, respectively.

As shown in FIGS. 4A-4E, the assembly 101a includes the conveyance mechanism 120. In the illustrated embodiment, the conveyance mechanism 120 includes a conveyor chain 121. The conveyor chain 121 may be formed as a continuous loop of chain mounted on sprockets 123. The sprockets 123 are partially seen in FIGS. 4B and 4D, and one of the sprockets 123 is visible in the cutaway portion of FIGS. 4C and 4D. In the illustrated embodiment, the assembly 101*a* includes six sprockets 123, although other numbers of sprockets 123 possible. One sprocket 123 is positioned at each end of the conveyance mechanism 120 and the remaining sprockets 123 are spaced evenly between the two end sprockets 123. In some embodiments, the sprockets 123 are not evenly spaced. In some embodiment, a sprocket 123 is positioned every few feet along the length of the conveyance mechanism 120. For example, a sprocket 123 can be positioned every 3 feet, every 2.5 feet, every 2 feet, every 1.5 feet, every 1 foot, or every six inches along the conveyance mechanism 120, as well as at greater or smaller spacings or spacings in between the listed values.

The sprockets 123 are rotatably supported on axles 124 that are mounted to a drive tray 125. In some embodiments, the drive tray 125 comprises a U-shape or a squared U-shape channel. In some embodiments, the sprockets 123 and are positioned substantially within the channel of the drive tray 125. In some embodiments, a top portion of the sprockets 123 extends about the drive tray 125, such that the top run of the conveyor chain 121 is positioned above the drive tray 123. The lower run of the conveyor chain 121 may be positioned within the drive tray 125.

A motor 126 is attached to one of the axles 124 and configured to drive on of the sprockets 123. The motor 126 drives one of the sprockets 123, which in turn, advances the conveyor chain 121. The motor 126 may be configured to operate in both directions (in other words, clockwise and counterclockwise) such that the conveyor chain 121 can be moved in both forward and backward directions. As will be described with reference to FIGS. 5A and 5B, a container can include engagement features that engage the conveyor chain 121, such that a container resting on the conveyor chain 121 moves with the conveyor chain 121. Thus, the conveyance mechanism 120 is configured to convey a container back and forth in a horizontal direction along the length of the conveyance mechanism 120.

In the illustrated embodiment, the motor 126 is connected to one of the middle axles 126, although this need not be the case in all embodiments. In the illustrated embodiment, the motor 126 is positioned on the inside of the assembly 101*a* (see FIG. 4A); again, this need not be the case in all embodiments. In some embodiments, the motor 126 is an electric motor. The motor 126 can be powered by the electrical system of the transport vehicle to which the container transfer system 100 is attached. Alternatively, the motor 126 can be separately powered, for example, by batteries or an external power source. The motor 126 can be connected to a user interface that allows an operator to control the motor 126. Although only a single motor 126 is illustrated from the assembly 101*a*, in some embodiments, more than one motor 126 can be included.

As shown in FIG. 4A, each assembly 101*a*, 101*b* includes its own motor 126*a*, 126*b*. In some embodiments, the motors 126*a*, 126*b* are synchronized such that the conveyor chains 121*a*, 121*b* are driven together, at the same speed, and in the same direction. In some embodiments, each motor 126*a*, 126*b* can be independently controlled. In some embodiments, a single motor 126 is connected via one or more drive shafts to a sprocket 123 on each of the assemblies 101*a*, 101*b* such that a single motor 126 drives the conveyor chains 121*a*, 121*b* of the assemblies 101*a*, 101*b*.

The conveyance mechanism 120 shown in the figures and described herein is provided by way of example only. In other embodiments, other types of systems can be used. For example, in some embodiments, a rotating acme or lead screw can replace the sprockets and conveyor chain in order to produce linear motion. In other embodiments, the conveyor chain can be replaced by a belt.

As noted previously, the conveyance mechanism 120 is supported by two lift mechanisms 140 and the lift mechanisms 140 are configured to raise and lower the conveyance mechanism 120 in the vertical direction. In the illustrated embodiment, each lift mechanism 140 includes an air spring 141. As illustrated, the air springs 141 are mounted substantially below each end of the conveyance mechanism 121. In some embodiments, the air springs 141 are coupled to the drive tray 125 with a tongued bracket 143 mounted in a groove of the drive tray 125 in a tongue-in-groove configuration (see cutaway portion of FIG. 4D). In some embodiment, the tongue and groove can be reversed: the groove can be included on the bracket 143 and the tongue on the drive tray 125. The tongue-in-groove configuration can be configured to allow some relative horizontal motion between the drive tray 125 and the air spring 141, while constraining their vertical motion together. In some embodiments, the bracket 143 is rigidly attached to the drive tray 125.

The air spring 141 can be pneumatically connected to a compressor (not shown) configured to supply pressurized air to the air spring 141. By adding air to the air spring 141 the height of the air spring 141 can be increased. As the height of the air spring 141 is increased, the conveyance mechanism 120 is raised vertically. Conversely, removing air from the air spring 141 (for example, by bleeding through a valve (not shown)) the height of the air spring 141 can be reduced, lowering the conveyance mechanism 120. In some embodiments, hydraulic elements can be used in place of (or in addition to) pneumatic elements.

Many transport vehicles onto which the container transfer system 100 can be installed include suitable compressed air systems for supplying air to the air springs 141. For example, a tractor having an air-ride suspension system is already equipped with suitable compressor technology to accommodate the lift mechanism 140. In some embodiments, a separate compressor or other source of pressurized air can be provided to provide air to the air springs 141.

Figure 8:
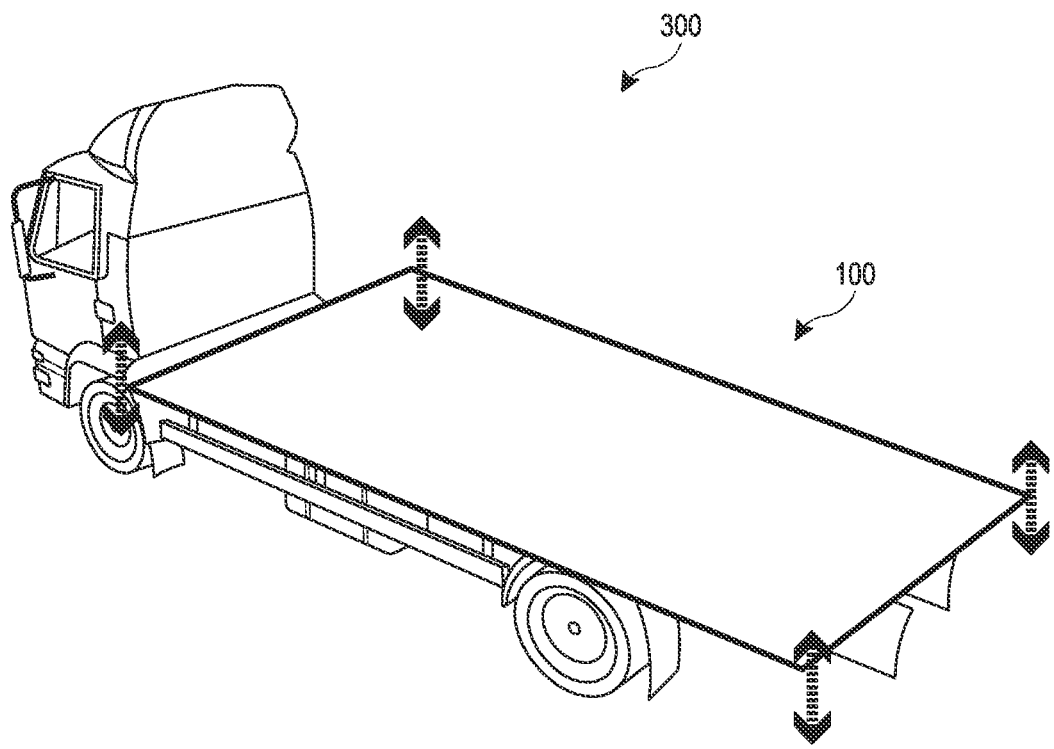
FIG. 8 is a perspective view illustrating an embodiment of a transport vehicle including a container transfer system that can be adjusted so as to be level.

In some embodiments, the air spring 141 of each lift mechanism 140 is individually adjustable. By adjusting the height of each air spring 141 on the four corners of the container transfer system 100, the height and angle of each conveyance mechanism 120 can be independently controlled an adjusted. In some embodiments, this can allow a load (for example, a container) to be tilted, raised, or lowered in any direction, and allow two container transfer systems 100 to be aligned as shown in FIG. 8.

Although an air spring 141 is shown in the figures and described herein, other mechanisms (for example, hydraulic rams) can be used in some embodiments. The air springs 141 can be controlled by a user interface that allows an operator to adjust the height of the lift mechanisms 140.

In the illustrated embodiment, each lift mechanism 140 also includes a telescoping strut 144. The telescoping strut 144 is configured such that its length is adjustable to adapt to the height of the air spring 141 and the conveyance mechanism 120. The telescoping strut 144 is biased toward an extended configuration. The telescoping strut 144 is connected at its upper end a stabilizer slide 145. The stabilizer slide 145 is configured to slidingly engage with the drive tray 125 of the conveyance mechanism 120. In some embodiments, the stabilizer slide 145 comprises a U-shaped bracket and the drive tray 125 is slidingly nested in the stabilizer slide 145. In some embodiments, the stabilizer slide 145 includes replaceable glide pads. In some embodiments, the glide pads may comprise Teflon. In some embodiments, the glide pads may include bearings or rollers. In some embodiments, the replaceable glide pads are positioned between the stabilizer slide 145 and the drive tray 125 to provide a smooth bearing surface at the junction between the drive tray 125 and the stabilizer slides 145. Thus, the upper end of telescoping strut 144 is slidingly engaged with the drive tray 125 in order to adapt to changes in the height of the air spring 141 and provide additional support for the conveyance mechanism 120. In some embodiments, the sliding engagement between the stabilizer slide 145 and the drive tray 125 allows the lift mechanism to account for varying angles of the conveyance mechanism 120 (for example, where one end of the conveyance mechanism 120 is lifted higher than the other). In some embodiments, the telescoping strut 144 is rigidly attached to the drive tray 125.

In the illustrated embodiment, each lift mechanism 140 includes a telescoping stabilizer bar 147. In some embodiments, the stabilizer bar 147 comprises a pivoting tie rod that diagonally connects the bracket 143 of the air spring 141 to the telescoping strut 144. In some embodiments, the stabilizer bar 147 provides additional support to the load and further couples the motion of the air spring 141 to that of the telescoping strut 144 and stabilizer slide 145. In some embodiments, the telescoping stabilizer bar 147 further accommodates for uneven independent adjustment of the air springs 141.

Each lift mechanism 140 is attached to a mounting frame 142. In some embodiments, each mounting frame 142 comprises a rigid support frame, for example, made from welded square or round tubing. In the illustrated embodiment, each mounting frame 142 is shaped as a right triangular prism, although other shapes are possible. As noted previously, the shape of the mounting frame 142 can be varied to fit the application of the container transfer system 100.

The chain drives 121 of the container transfer system 100 are configured to interface with containers, such that the container transfer system 100 can convey containers back and forth in a horizontal direction without requiring the use of external machinery, such as forklifts, cranes, hoists, etc. The height of the container transfer system 100 can be adjusted by the lift mechanisms 140 in order to match the height of another container transfer system 100 to which the container can be conveyed as shown in FIG. 3.

Figure 5A:
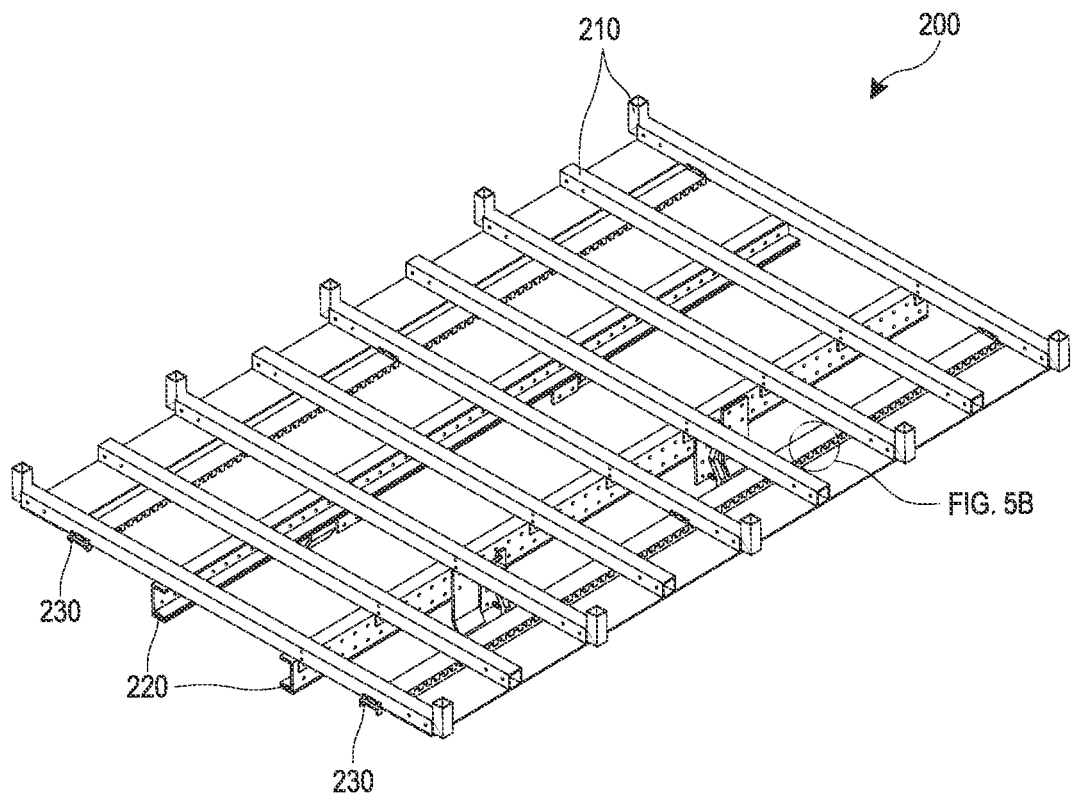
FIG. 5A is a perspective view of a base of a container.

FIG. 5A is a perspective view of a base 200 for a container that can be used with the container transfer systems 100 described herein. The base 200 is configured to support the container. Although not shown, in some embodiments, the container is a rectangular enclosure, although other shapes are possible. As noted previously, in some embodiments, the container is fully enclosed and lockable, while, in other embodiments, the container remains open (for example, having an open top, sides, and/or end). In some embodiments, a flat platform may be mounted on the base 200 to form a flatbed.

As shown in FIG. 5A, the base 200 can comprise a frame of transverse supports 210 supported by longitudinal supports 220. In the illustrated embodiment, the transverse supports comprise square tubing, although other configurations are possible. In the illustrated embodiment, the longitudinal supports 220 comprise channel beams, although, again, other configurations are possible. The number and arrangement of transverse supports 210 and longitudinal supports 220 can be varied from the example embodiment shown in FIG. 5.

Figure 5B:
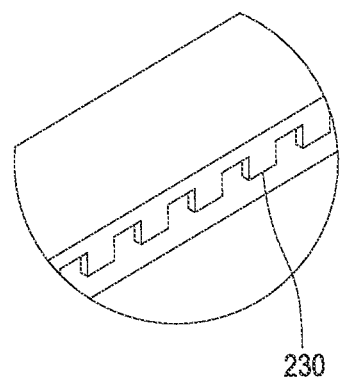
FIG. 5B is a detail perspective view of an engagement structure on the base of FIG. 5A.

As also shown in FIG. 5A, and in the detail view of FIG. 5B, the base 200 also includes engagement structures 230. In the illustrated embodiment, the engagement structures 230 are drive trains that extend longitudinally along the bottom of the base 200. The two engagement structures 230 are spaced apart in a configuration that matches that of the two assemblies 101a, 101b of the container transfer system 100 of FIG. 4A. Thus, when the base 200 is placed on the container transfer system 100, the two engagement structures 230 rest on the conveyance mechanism 120a, 120b. In the illustrated embodiment, the engagement structures 230 include a toothed configuration as shown in FIG. 5B. The toothed configuration is configured to engage the conveyor chains 121a, 121b. Thus, motion of the conveyor chains 121a, 121b is imparted to the base 200. In some embodiments, the engagement structures 230 may comprise other forms that correspond to features on the conveyance mechanisms 120a, 120b.

In some embodiments, the base 200 is made from modular components such that the size and configuration of the base 200 can be modified and adjusted to match the size and shape of a particular container with which it will be used.

Figure 6A:
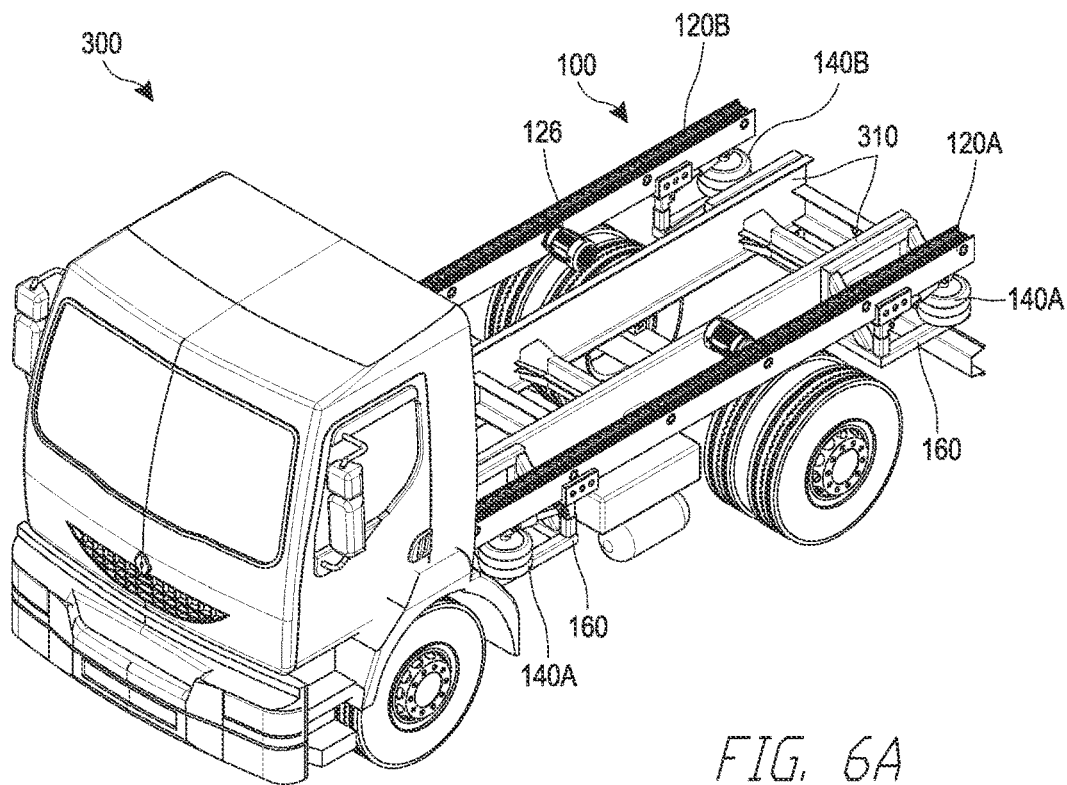
FIG. 6A is a perspective view of a transport vehicle including the container transfer system of FIG. 4A.
Figure 6B:
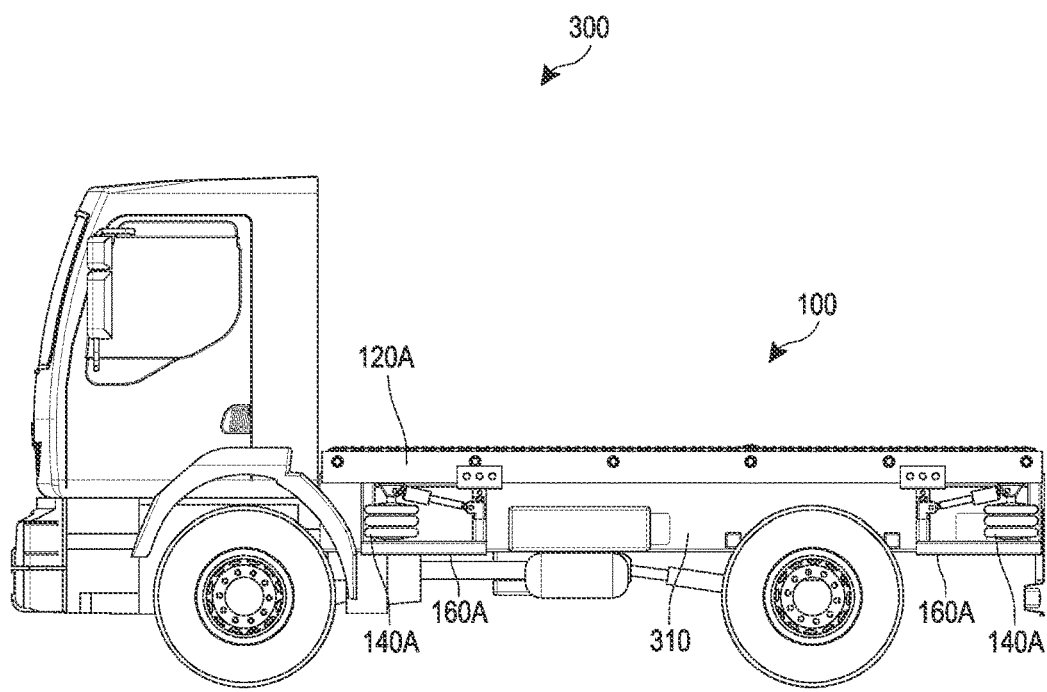
FIG. 6B is a side view of the transport vehicle of FIG. 6A.

FIG. 6A is a perspective view of a transport vehicle 300 including the container transfer system 100 of FIG. 4A. FIG. 6B is a side view of the transport vehicle 300 of FIG. 6A. In the illustrated embodiment, the transport vehicle 300 is a delivery truck and is configured to receive one container thereon (for example, similar to the second transport vehicle 52 shown in FIG. 3). The mounting frames 142 are mounted to frame members 310 of the transport vehicle 300. As will be described below with reference to FIGS. 7A-7D, in some embodiments, when the container transfer system 100 is conveying a container, the base 200 of the container is lifted above (not-contacting) the frame members 310 of the transport vehicle 300. In some embodiments, once the container is positioned on the container transfer system 100, the lift mechanisms 140 can lower the container so that it rests on the frame members 310. In some embodiments, the longitudinal supports 220 of the base 200 rest on the frame members 310 of the transport vehicle 300. In some embodiments, the container can then be locked to the frame members 310 to ensure stability during transport.

Figure 7A:
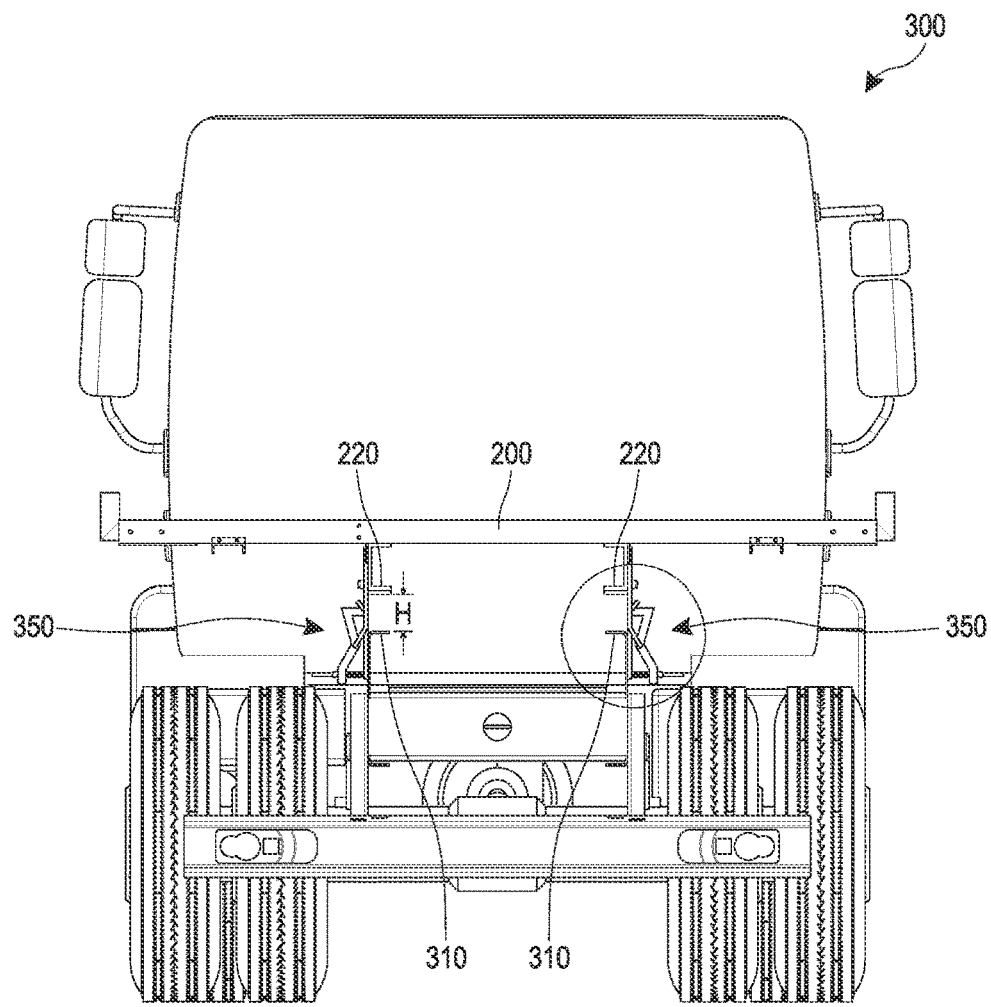
FIG. 7A is a rear view of a transport vehicle and illustrates a locking mechanism for locking a container to the transport vehicle in an unlocked state.
Figure 7B:
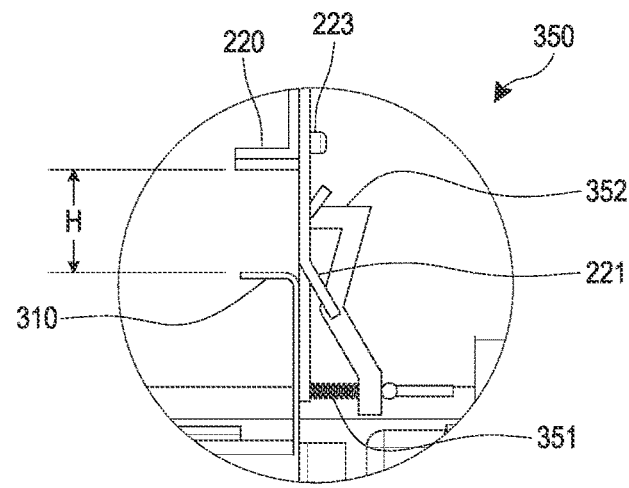
FIG. 7B is a detail view of the locking mechanism of FIG. 7A in an unlocked state.
Figure 7C:
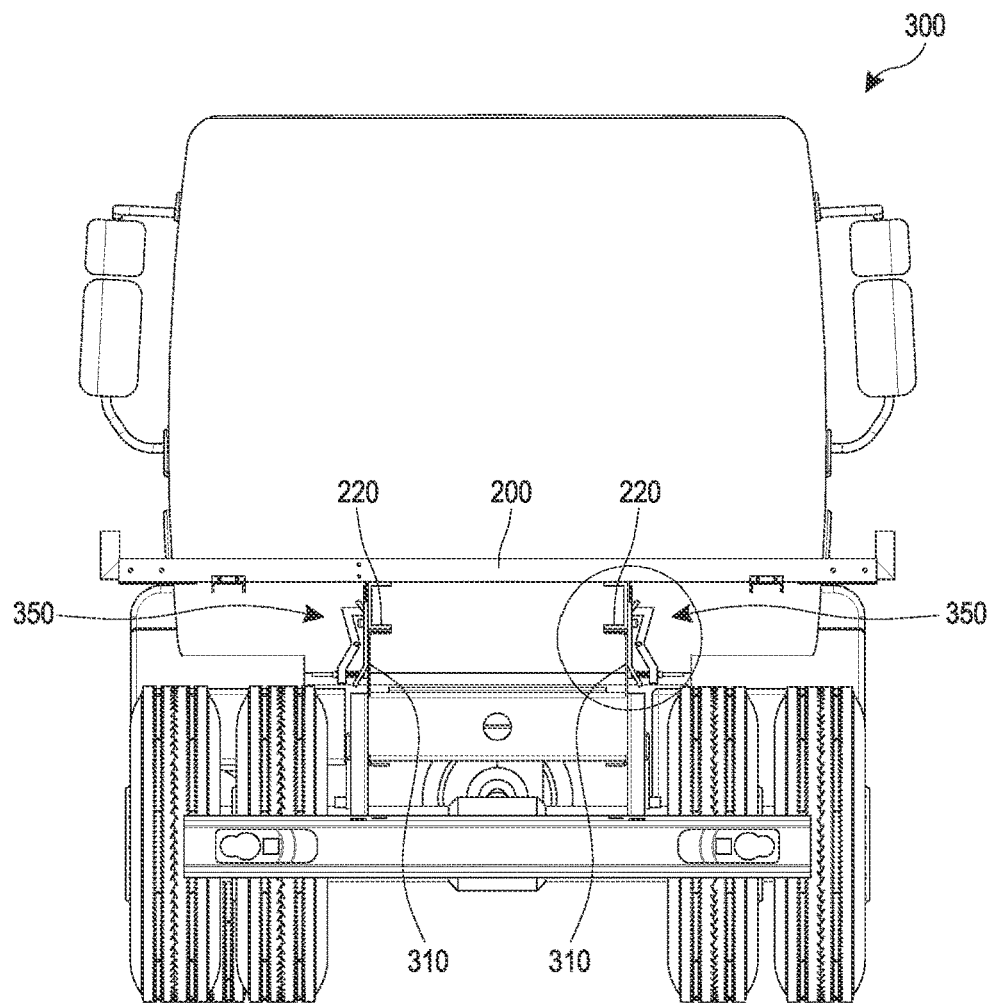
FIG. 7C is a rear view of the transport vehicle and locking mechanism of FIG. 7A, illustrated in a locked state.
Figure 7D:
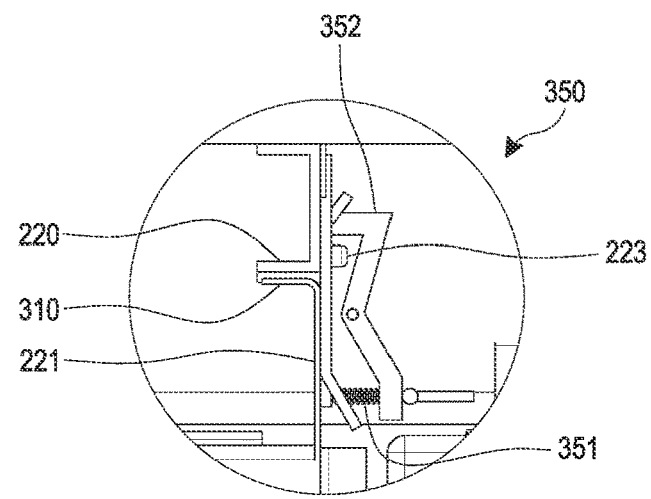
FIG. 7D is a detail view of the locking mechanism of FIG. 7C in a locked state.

FIGS. 7A and 7C are rear views of the transport vehicle 300 and illustrate a locking mechanism 350 for locking the base 200 to the transport vehicle 300 in unlocked state and locked states, respectively. In FIGS. 7A and 7C, the container transfer system 100 is omitted for clarity. FIGS. 7B and 7D are detail views of the locking mechanism 350 in unlocked and locked states, respectively.

As illustrated in FIG. 7A, the base 200 is lifted by the lift mechanisms 140 of the container transfer system 100 such that the longitudinal supports 220 are positioned a distance H above the frame members 310 of the vehicle 300. In some embodiments, the container transfer system 100 can position the base 200 in this position when the container is being conveyed back and forth. In this position, the weight of the container is supported by the container transfer system 100. Further, in this position, in some embodiments, the container is not locked to the vehicle 300. As shown in FIG. 7B, a locking pin 351 of the locking system 300 is not engaged with the longitudinal support 220 of the base 200.

FIGS. 7C and 7D illustrate an example of the locked configuration. As shown, the base 200 has been lowered such that that longitudinal supports 220 rest on the frame members 310. In some embodiments, the container transfer system 100 may place the container in this position during transport. In some embodiments, at least a portion of the weight of the container is supported on the frame members 310 of the vehicle 300 in this position. In some embodiments, the longitudinal supports 220 of the base 200 include angled guide members 221 that extend downwardly to guide the longitudinal supports 220 onto the frame members 310 as the container transfer system 100 lowers the container. As shown in FIG. 7D, once lowered, the locking pin 351 engages with the longitudinal supports 220 of the base 200 to lock the base into position on the frame members 310. In some embodiments, the locking pin 351 includes a portion that extends through an opening in the angled guide members 221. In some embodiments, the locking pin 351 includes a portion 352 that locks over a projection 223 on the longitudinal supports 220. In some embodiments, other methods for securing the container to the transport vehicle 300 are possible.

FIG. 8 is a perspective view illustrating an embodiment of a transport vehicle 300 including a container transfer system 100 and illustrates that each corner of the container transfer system 100 can be independently adjusted. As previously described, a lift mechanism 140 can be included in each corner of the container transfer system 100. This allows each corner to be raised or lowered individually. This control can allow the transfer system 100 to be aligned with another container transfer system 100 of another transport vehicle 300 regardless of uneven ground condition or a height difference between the two vehicles. This control can also allow a container placed on the container transfer system 100 to be leveled.

Figure 9:
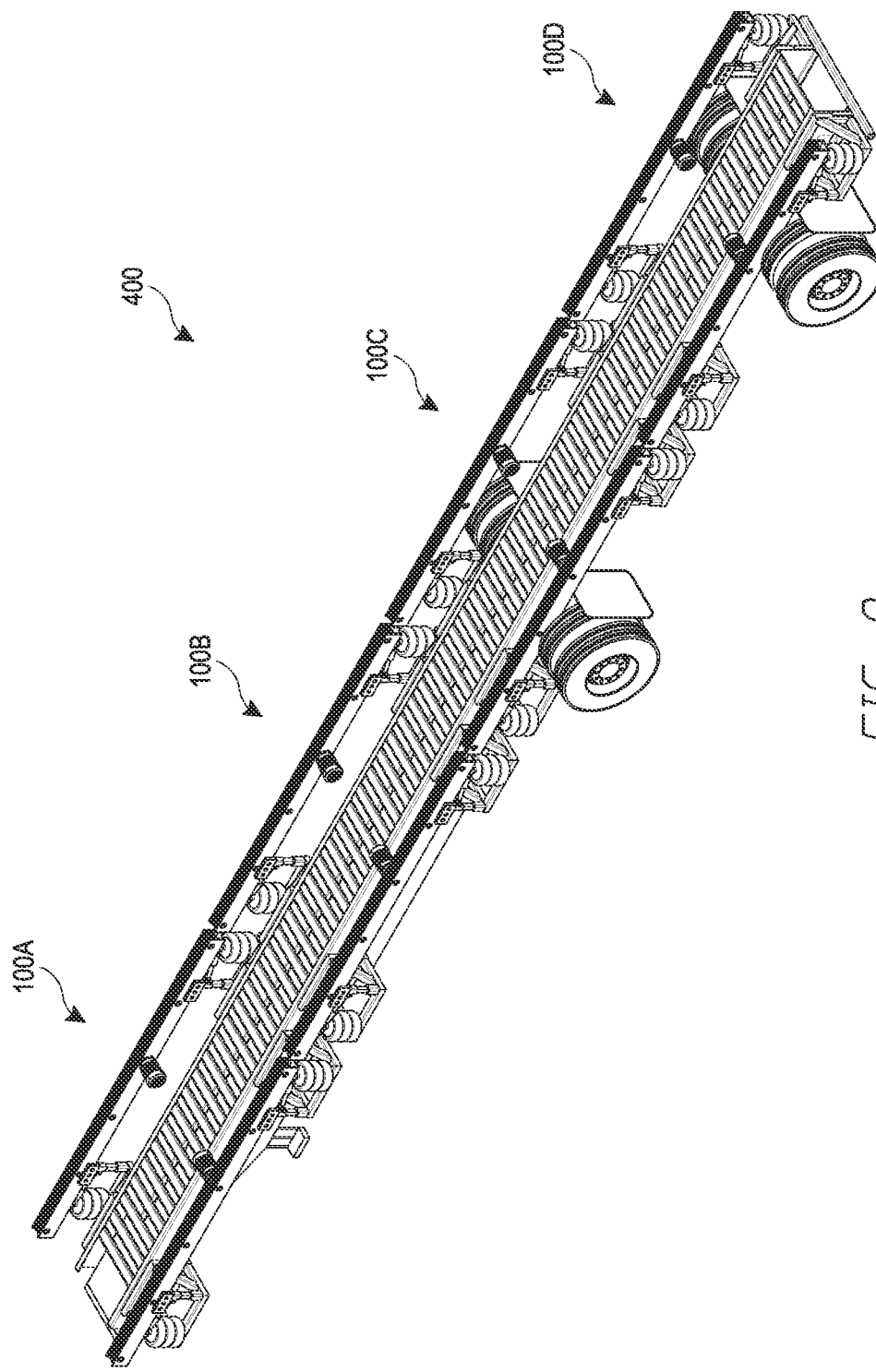
FIG. 9 illustrates an embodiment of a semi-trailer including four container transfer systems.

FIG. 9 illustrates an embodiment of a semi-trailer 400 including four container transfer systems 100a-100d. In some embodiments, this configuration allows the semi-trailer 400 to hold four containers (for example, similar to the transport vehicle 51 of FIG. 3). In some embodiments, the container transfer systems 100a-100d are independently operable. In some embodiments, the container transfer systems 100a-100d operate together. In some embodiments, the semi-trailer 400 can include other numbers of container transfer systems, for example, one, two, three, five, six or more.

Figure 10:
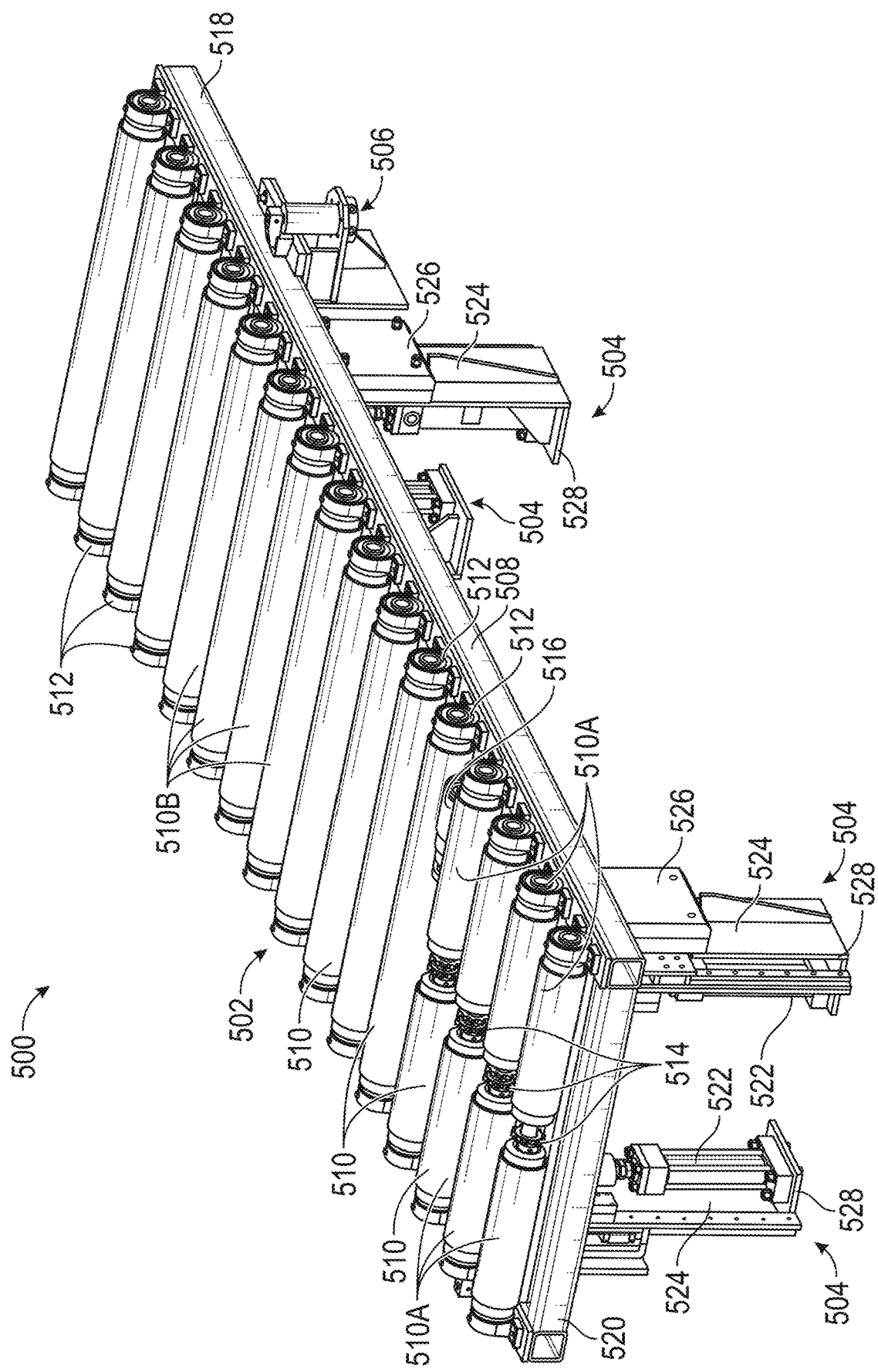
FIG. 10 is a perspective view of another embodiment of a container transfer system including lift assemblies and a conveyance assembly.
Figure 17A:
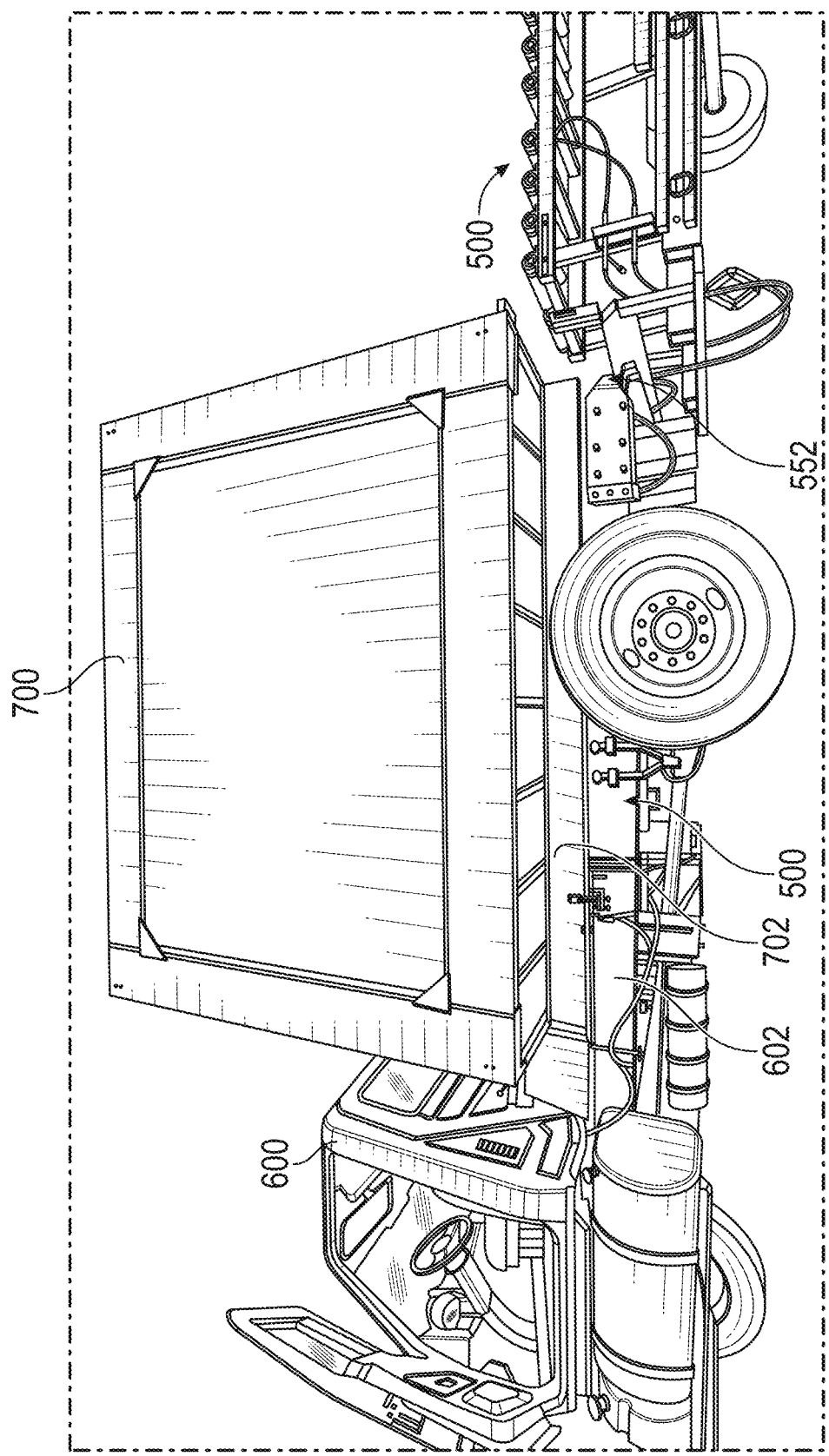
FIGS. 17A and 17B are views illustrating the container transfer system of FIG. 10 during use, transferring a container between a container transfer system installed on a vehicle and a container transfer system installed on a rack.
Figure 17B:
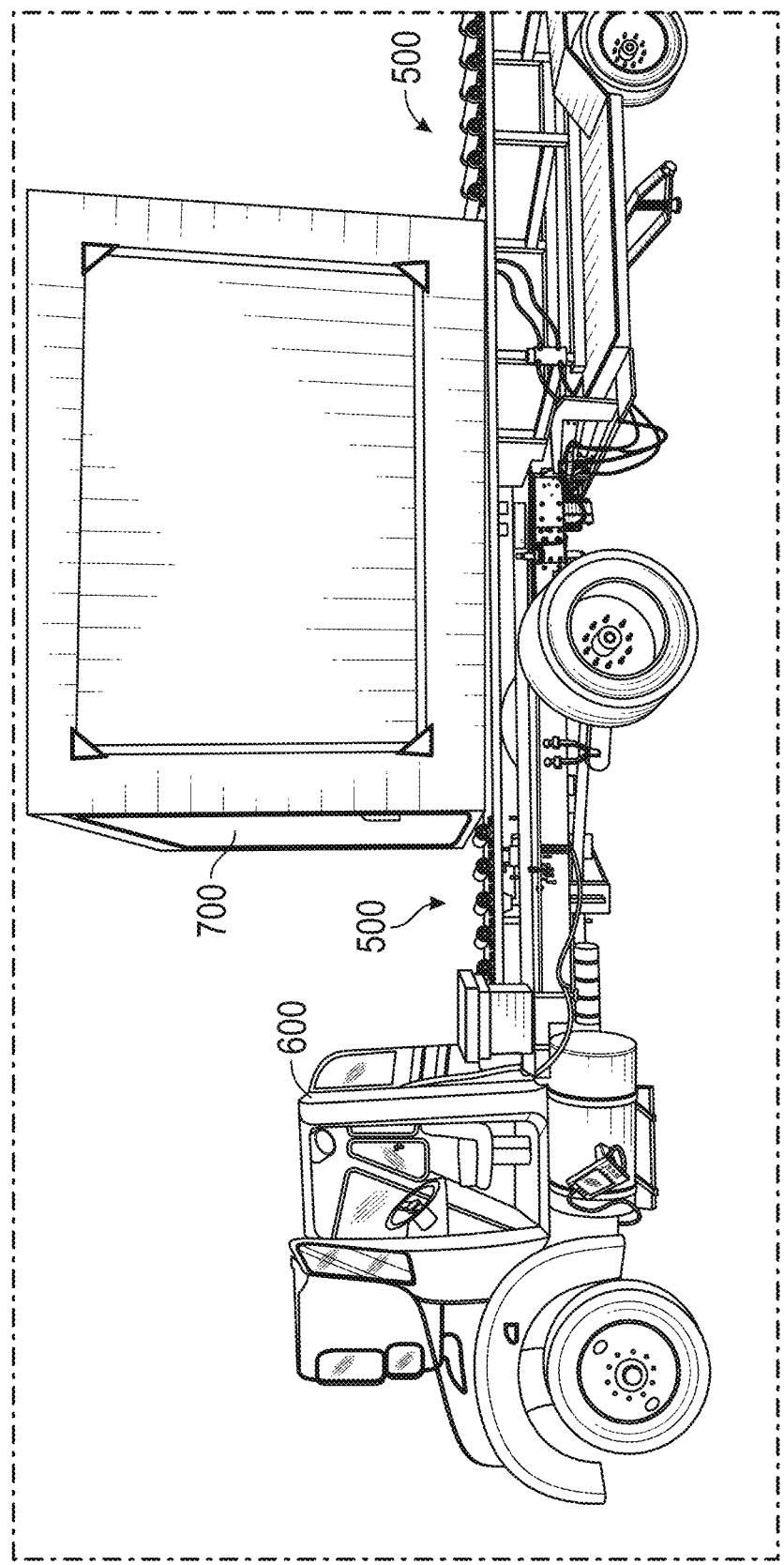

FIG. 10 is a perspective view of another embodiment of a container transfer system 500. As will be described below, the container transfer system 500 can be configured to transfer moveable containers (such as the container 700 shown in FIG. 15) between two vehicles that each include the container transfer system 500 and/or between a vehicle including the container transfer system 500 and a compatible rack (for example, as shown in FIGS. 17A and 17B). The container transfer system 500 may provide any or all of the advantages described above as well as others. Examples of a vehicle 600 including the container transfer system 500 are shown in FIGS. 13A-14 and 17A-17B, which are described below. In some embodiments, the container transfer system 500 can be considered a horizontal transfer system, as it can be configured to transfer containers in a horizontal or substantially horizontal direction. The container transfer system 500 can transfer loaded or unloaded containers without having to open, load, and unload the containers, providing the benefits described above.

Figure 13A:
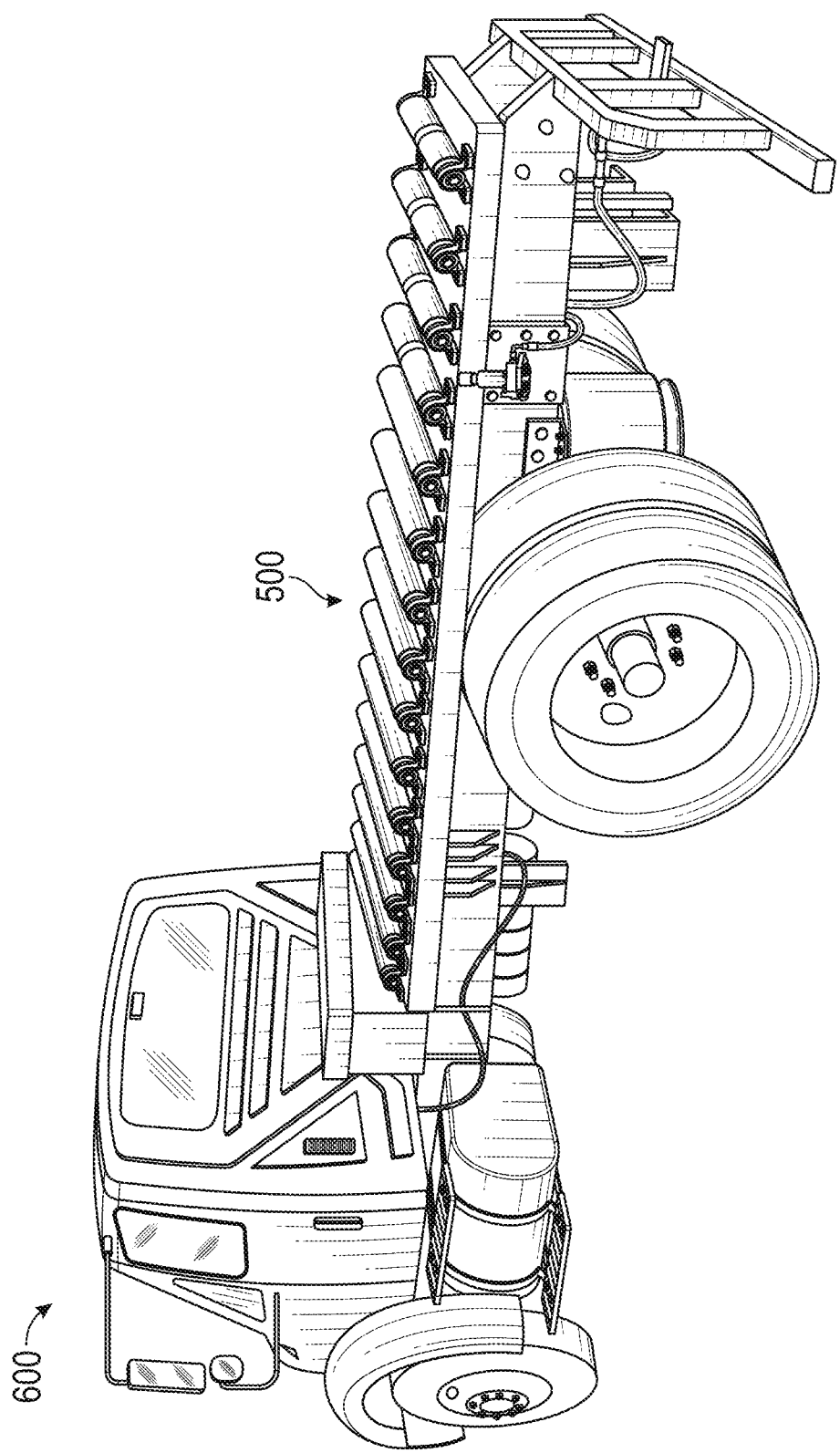
FIG. 13A illustrates a vehicle having the container transfer system of FIG. 10 installed thereon, according to an embodiment.
Figure 13B:
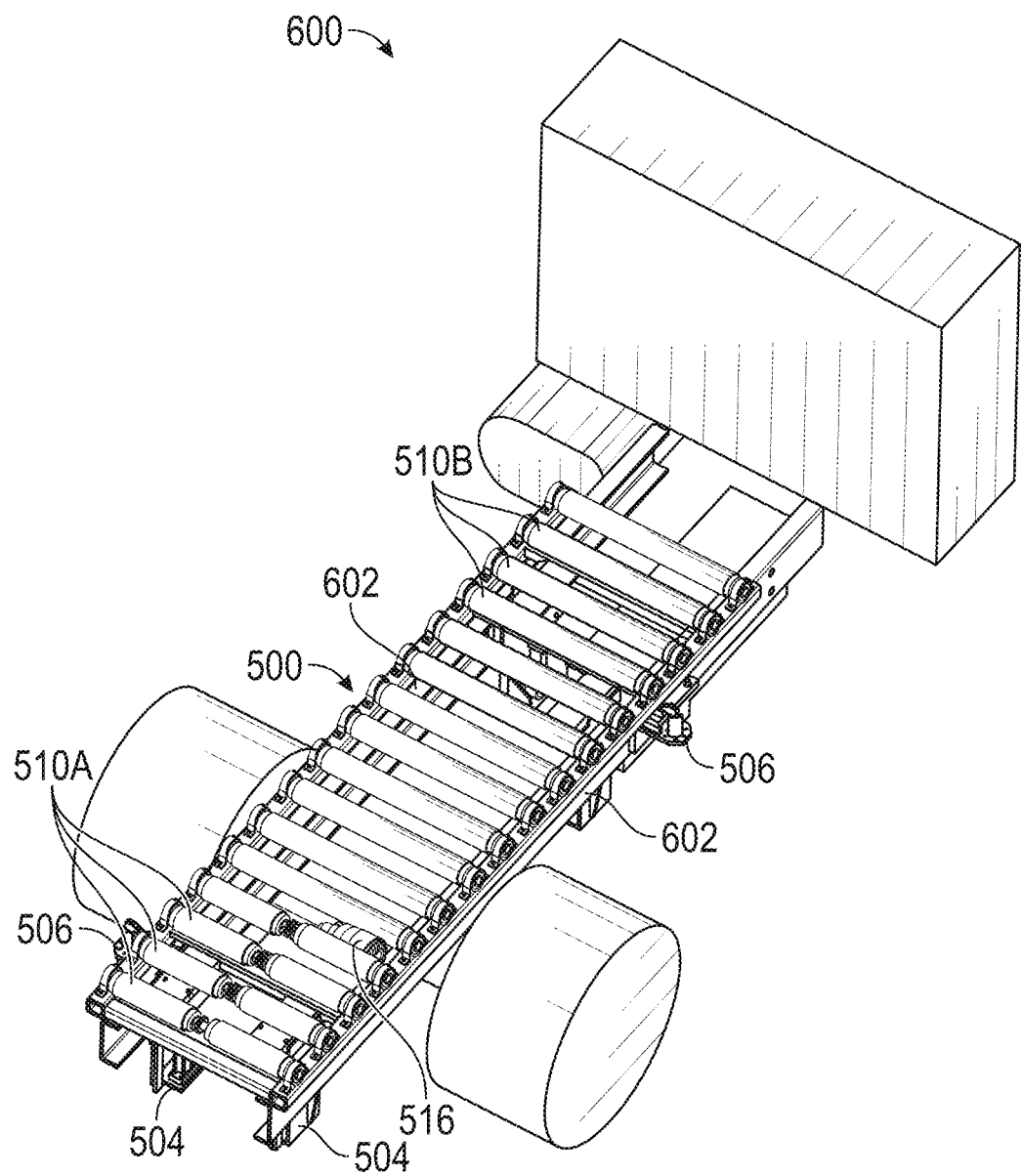
FIG. 13B is a top perspective view illustrating the container transfer system of FIG. 10 installed on a model of the vehicle.

In the illustrated embodiment of FIG. 10, the container transfer system 500 comprises a conveyance assembly 502, a plurality of lift assemblies 504, and one or more locking assemblies 506. The conveyance assembly 502 is configured to move containers (such as the container 700 of FIG. 15) in a horizontal or substantially horizontal direction. The conveyance assembly 502 can be mounted to (e.g., on top of) the plurality of lift assemblies 504. Further, the plurality of lift assemblies 504 can be mounted to a vehicle or storage rack. For example, as shown in FIGS. 13A-14, the plurality of lift assemblies 504 can be mounted to a chassis of a vehicle 600, such as a transport truck.

The plurality of lift assemblies 504 are configured to move the conveyance assembly 502 in a substantially vertical direction. That is the plurality of lift assemblies 504 can be configured to raise and lower the conveyance assembly 502. In some instances, raising and lowering the conveyance assembly 502 can be useful to vertically align a height of the container transfer system 500 with a height of another container transfer system 500 such that a container supported thereon can be vertically transferred between the two. In some embodiments, the lift assemblies 504 can be configured to lower the conveyance assembly 502 such that it rests substantially on top of the chassis of the vehicle. This may be an advantageous position during movement (e.g., driving) of the vehicle as it can increase the stability of any containers loaded onto the container transport system 500 and direct the loads associated with the containers down onto the chassis of the vehicle.

In the illustrated embodiment, the container transfer system 500 includes four lift assemblies 504 positioned generally in the four corners of the conveyance assembly 502. This may be advantageous as, not only does it allow the conveyance assembly 502 to be raised and lowered, it also allows the conveyance assembly 502 be leveled in both longitudinal and transverse directions (e.g., for tilt control). This also may facilitate alignment of two container transfer systems 500 such that containers can be transferred therebetween.

Figure 12:
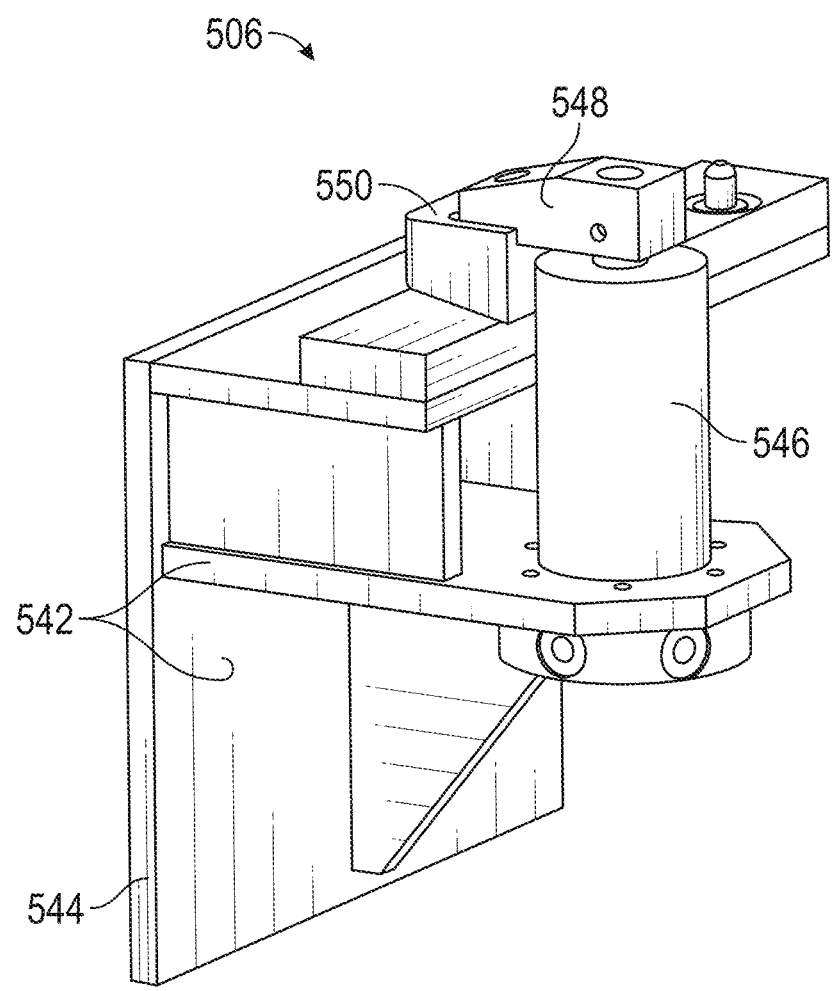
FIG. 12 is a perspective view of a locking assembly of the container transfer system of FIG. 10.

The container transfer system 500 of FIG. 10 also includes one or more locking assemblies 506. The locking assemblies 506 can be configured to lock a container in place once it has been loaded onto the container transfer system 500. For example, the locking assemblies 506 can, when engaged, be configured to prevent a container from moving forward or backwards along the longitudinal direction of the conveyance mechanism 502. An example locking assembly 506 is shown in FIG. 12, which is described in more detail below.

With continued reference to FIG. 10, the illustrated embodiment of the conveyance assembly 502 will now be described in more detail. As illustrated, the conveyance assembly comprises a frame 508 and rollers 510. The frame 508 is configured to provide structural support for the container transfer system 500 as well as to support additional components of the conveyance assembly 502. In the illustrated embodiment, the frame 508 comprises longitudinal members 518 and transverse members 520. Other configurations for the frame 508 may also be possible.

The rollers 510 are mounted to and supported by the frame 508. For example, in the illustrated embodiment, the rollers 510 are supported by bearings 512 which are mounted to the longitudinal members 518 of the frame 508. The bearings 512 can be configured to allow the rollers 510 to rotate to allow movement or conveyance of containers along the longitudinal direction of the conveyance assembly 502.

In the illustrated embodiment of FIG. 10, the rollers 510 comprise a set of drivable rollers 510a (or active rollers) and a set of passive rollers 510b (or idler rollers). As will be described in more detail below, the drivable rollers 510a can be actively driven or rotated to cause a container positioned thereon to be conveyed along the longitudinal direction of the conveyance assembly 502. The passive rollers 510b are not actively driven. That is, the passive rollers 510b are configured to rotate freely. Thus, as the active rollers 510a drive movement of a container along the conveyance assembly 502, the passive rollers 510b allow the container to continue to move along the conveyance assembly 502.

In the illustrated embodiment, the conveyance assembly 502 includes four drivable rollers 510a, which are positioned on one end (e.g., the distal most end) of the conveyance assembly 502. Other numbers and positions for the drivable rollers 510a are also possible. As shown in FIG. 10, in some embodiments, the drivable rollers 510a can be split (for example, in the middle) to allow for placement of a sprocket 514. A chain or other similar mechanism (e.g., a belt) can be mounted on the sprockets 514 of the drivable rollers 510a and connected to a motor 516. The motor 516 can drive rotation of the chain, causing corresponding rotation of the sprockets 514 and driving the rotation of the drivable rollers 510a. The motor 516 can be supported by the frame 508. In some embodiments, the motor 516 can be a hydraulic motor, connected to and driven by a hydraulic system of the vehicle to which the container transfer system 500 is mounted or by an independent power source. In other embodiments, other types of motors (e.g., electric or others) can be used. Further, while the illustrated embodiment includes drivable rollers 510a that are split in the middle to accommodate the sprockets 514, other positions for the sprockets 514 are also possible. For example, the sprockets 514 could be positioned on ends of the drivable rollers 510a.

Figure 11:
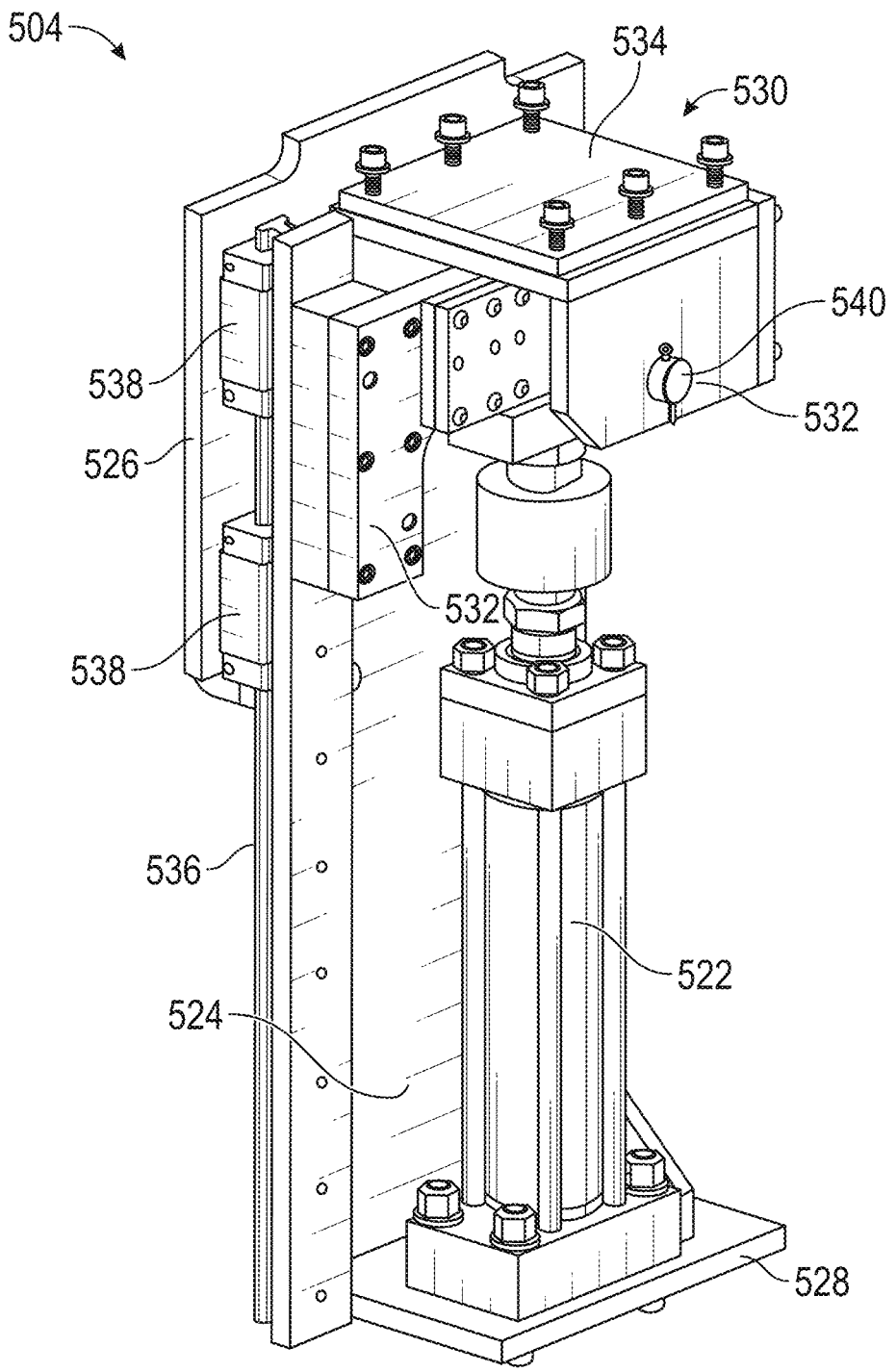
FIG. 11 is a perspective view of an embodiment of one of the lift assemblies of the container transfer system of FIG. 10.

As shown in FIG. 10, the lift assemblies 504 can comprise a lift actuator 522, brackets 524, as well as other features shown in the detailed view of FIG. 11. Before turning to FIG. 11, however, several features of the lift assemblies 504 will be described briefly with reference to FIG. 10. For example, the lift assemblies 504 can include brackets 524 that include first mounting plates 526 and lift actuator support plates 528. The first mounting plates 526 can be configured to attach the lift assemblies 504 to, for example, the chassis of a vehicle as will be described in more detail in FIGS. 13A-13C. The brackets 524 can extend between the first mounting plates 526 and the lift actuator support plates 528. The lift actuators 522 can be mounted on the lift actuator support plates 528. For example, a bottom portion of the lift actuators 522 can be attached to the lift actuator support plates 528. A top portion of the lift actuators 522 can be attached to the frame 508 of the conveyance assembly 502, such that with the lift actuators 522 are actuated, the lift actuators 522 can raise or lower the conveyance assembly 502.

FIG. 11 is a perspective view of an embodiment of one of the lift assemblies 504 of the container transfer system 500 of FIG. 10 and illustrates additional details thereof. As shown in FIG. 11, the illustrated embodiment of the lift assembly 504 can include the lift actuator 522 and the bracket 524 (which as described above can include the first mounting plate 526 and the lift actuator support plate 528). The lift actuator 522 can be a linear actuator. In some embodiments, the lift actuator 522 is hydraulic. For example, the lift actuator 522 may comprise a hydraulic ram. When both the motor 516 of the conveyance assembly 520 and the lift actuator 522 of the lift assemblies 504 are hydraulic, the container transfer system 500 can advantageously be driven by a hydraulic system of the vehicle to which the container transfer system 500 is mounted or an independent power source. In other embodiments, other types of linear actuators can be used in place of a hydraulic ram.

Figure 13C:
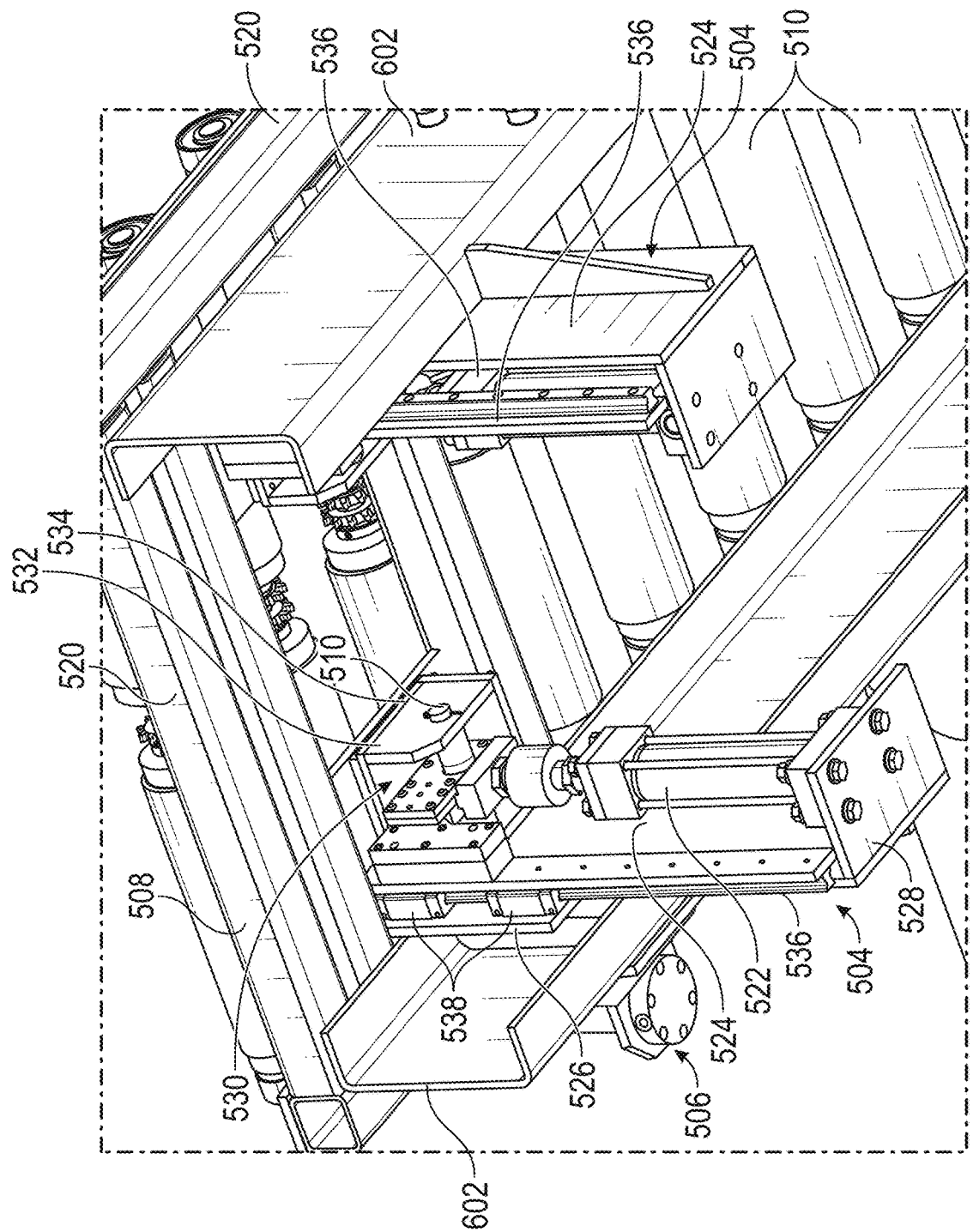
FIG. 13C is a bottom, detail, perspective view illustrating the container transfer system of FIG. 10 installed on the model of the vehicle.
Figure 14:
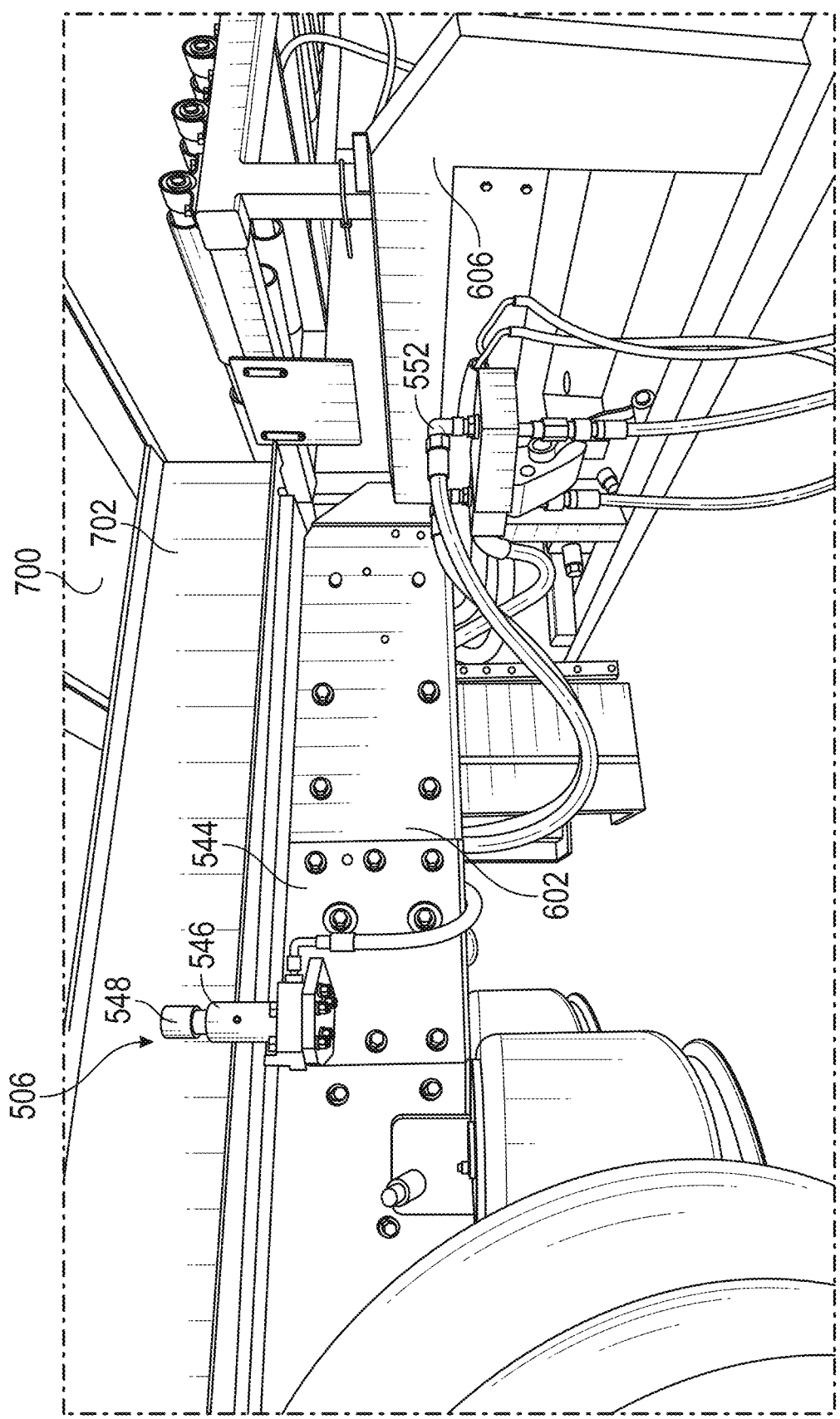
FIG. 14 is a detail view illustrating a portion of the container transfer system of FIG. 10, including an embodiment of a locking mechanism and hydraulic connections.

As mentioned above, the lift actuator 522 is supported by the lift actuator support plate 528 of the bracket 524 which can be mounted to the chassis of a vehicle (see, for example, FIG. 13C). The lift actuator 522 can also be attached to the frame 508 of the conveyance assembly 502. For example, as shown in FIG. 11, a top portion of the lift actuator 522 is connected to a frame attachment structure 530 that is configured to attach to the frame 508 of the conveyance assembly 502. In the illustrated embodiment, for example, the frame attachment structure 530 comprises bracket 532, and a second mounting plate 534. The bracket 532 can be configured to attach to the lift actuator 522 and the second mounting plate 534 can be configured to attach to the frame 508 of the conveyance assembly 502. In the illustrated embodiment, the bracket 532 is configured to attach to the lift actuator 522 using a pin 540. The pin 540 can be removed to detach the lift actuator 522 from the conveyance assembly 502 which may facilitate replacement of the lift actuator 522 in the event that a repair is needed.

FIG. 11 also illustrates the that bracket 532 of the frame attachment structure 530 can be attached to a rail 536. The rail 536 can be a linear rail. The rail 536 can be engaged with guides 538 such that the motion between the rail 536 and the guides 538 is constrained such that motion is only permitted along the longitudinal axis of the rail 536. The longitudinal axis of the rail 536 can be aligned with (for example, parallel to) the longitudinal axis or axis of actuation of the lift actuator 522. The guides 538 can be attached to the bracket 524, which as described previously, can be mounted to the chassis of the vehicle via the first mounting plate 526.

Motion of the lift assembly 504 will now be described with reference to the embodiment of FIG. 11. The bracket 524 is fixedly attached to the chassis of a vehicle (see FIG. 13C) via the first mounting plate 526. The lift actuator 522 is fixedly attached to the bracket 524 via the lift actuator support plate 528. The lift actuator 522 is also attached to the frame 508 of the conveyance assembly 502 via the frame attachment structure 530 which is connected to the lift actuator 522 through bracket 524. As the actuator 522 is actuated, the lift actuator 522 can extend, causing the lift actuator 522 to lift the frame attachment structure 530 and correspondingly, to lift the conveyance assembly 502. At the same time, the rail 536 slides along the guides 538, which serve to ensure that motion is constrained along the axis of actuation of the lift actuator 522. In this way, the lift assemblies 504 can raise and lower the conveyance assembly 502 relative to the chassis of the vehicle.

Further, each of the lift assemblies 504 can be independently operable and adjustable such that the longitudinal and transverse tilt of the conveyance assembly 502 can adjusted and leveled.

FIG. 12 is a perspective view of the locking assembly 506 of the container transfer system 500 of FIG. 10. In the illustrated embodiment, the locking assembly 506 comprises a bracket 542 including an attachment plate 544. In some embodiments, the attachment plate 544 is configured to attach the locking assembly 506 to the chassis of the vehicle (as best seen in FIG. 14). The bracket 542 of the locking assembly 506 also supports an actuator 546 which includes a locking pawl 548. The actuator 546 can be configured to raise and lower the locking pawl 548. In the lowered position (for example, as shown in FIG. 12), the locking pawl 548 can engage with a lug 550. The lug 550 can be attached to a container, such as the container 700 of FIG. 15.

When the locking pawl 548 engages the lug 550, motion of the container 700 can be constrained, locking the container in place. When the locking pawl 548 is in the raised position, it does not engage the lug 550, allowing for motion of the container. For example, when the locking pawl 548 is not engaged with the lug 550, the conveyance assembly 502 can move the container forward and/or backwards along the longitudinal axis of the conveyance assembly 502.

In some embodiments, the actuator 546 can be a hydraulic actuator, such as a hydraulic ram. The hydraulic actuator 546 can be connected to a hydraulic system of the vehicle (or an independent power source) which can be controlled to actuate the actuator 546. Other types of actuators, for example, electric linear actuators can also be used. In some embodiments, locking assembly 506 can be replaced with a mechanical locking assembly, such as that described above with reference to FIGS. 7A-7D.

FIG. 13A illustrates a vehicle 600 having the container transfer system 500 of FIG. 10 installed thereon, according to an embodiment. In the illustrated embodiment, the vehicle 600 comprises a truck, such as a transport truck, although other types of vehicles can also be used. As shown, in the illustrated embodiment, the container transfer system 500 is positioned over the chassis of the vehicle 600 such that the conveyance assembly 502 is generally positioned between the wheels of the vehicle. Because it is difficult to see how the container transfer system 500 is attached to the vehicle 600 in FIG. 13A, FIGS. 13B and 13C illustrate the vehicle as a simplified model to better illustrate the interactions between the container transfer system 500 and the vehicle 600.

FIG. 13B is a top perspective view illustrating the container transfer system 500 of FIG. 10 installed on a model of the vehicle 600. As better seen in FIG. 13B, the vehicle 600 comprises a chassis including chassis rails 602. The container transport system 500 is positioned on the vehicle 600 such that it can be supported by the chassis rails 602. The lift assemblies 504 can be attached to the chassis rails 602 as better seen in FIG. 13C.

FIG. 13C is a bottom, detail, perspective view illustrating the container transfer system 500 of FIG. 10 installed on the model of the vehicle 600. In this view, one can see how the lift assemblies 504 can be attached to the chassis rails 602, according to the illustrated embodiment. As shown, the first mounting plates 526 of the brackets 524 of the lift assemblies 504 can be attached to inner surfaces of the chassis rails 602. Further, the frame 508 of the conveyance assembly 502 can rest on or substantially on the chassis rails 602 when the lift actuators 522 are in the lowered position. When actuated, the lift actuators 522 can raise the conveyance assembly 502 off the chassis rails 602 to a position above the chassis rails 602.

FIG. 14 is a detail view illustrating a portion of the container transfer system 500 of FIG. 10, including an embodiment of a locking assembly 506 and hydraulic connections 552. In this view, the connection between the attachment plate 544 of the bracket 542 of the locking assembly 506 and the chassis rail 602 of the chassis of the vehicle 600 can be seen. As shown, in the illustrated embodiment, the locking assembly 506 is attached to the outer surface of the chassis rail 602. Other placements for the locking assembly 506 are also possible.

FIG. 14 also illustrates how, in the illustrated embodiment, the locking assembly 506 can engage with a container 700. As better seen in FIG. 15, the container 700 can include container rails 702 on a bottom surface thereof. When the container 700 is positioned on the container transport system 500, the container rails 702 are positioned in proximity the locking assembly 506. The container rails 702 can include the lug 550 (not visible in FIG. 14), which can engage with the locking pawl 548 to secure the container 700 relative to the container transport system 500 and chassis of the vehicle 600.

FIG. 14 also illustrates that the container transfer system 500 can include hydraulic connections 552 for connecting to corresponding hydraulic connections of another container transfer system 500. In the illustrated embodiment, these hydraulic connections 552 are positioned on the bumper 606 of the vehicle 600, although other locations for the hydraulic connections 552 are also possible. As described previously, the container transfer system 500 of the vehicle 600 can be powered or actuated using a hydraulic system on the vehicle 600. The hydraulic system of the vehicle can drive the conveyance assembly 502, lift assemblies 504, and locking assemblies 506. In some embodiments, it may be desirable to move a container 700 from the vehicle 600 to another container transfer system 500 on a rack. Such a container transfer system 500 on the rack may not include a hydraulic system to power the hydraulic components thereof. Accordingly, the hydraulic system of the vehicle 600 can be connected to the hydraulic components of the container transfer system 500 of the rack using the hydraulic connections 552 as shown in FIG. 14. This can allow the hydraulic system of the vehicle to also power the hydraulic components of the container transfer system 500 of the rack.

Figure 15:
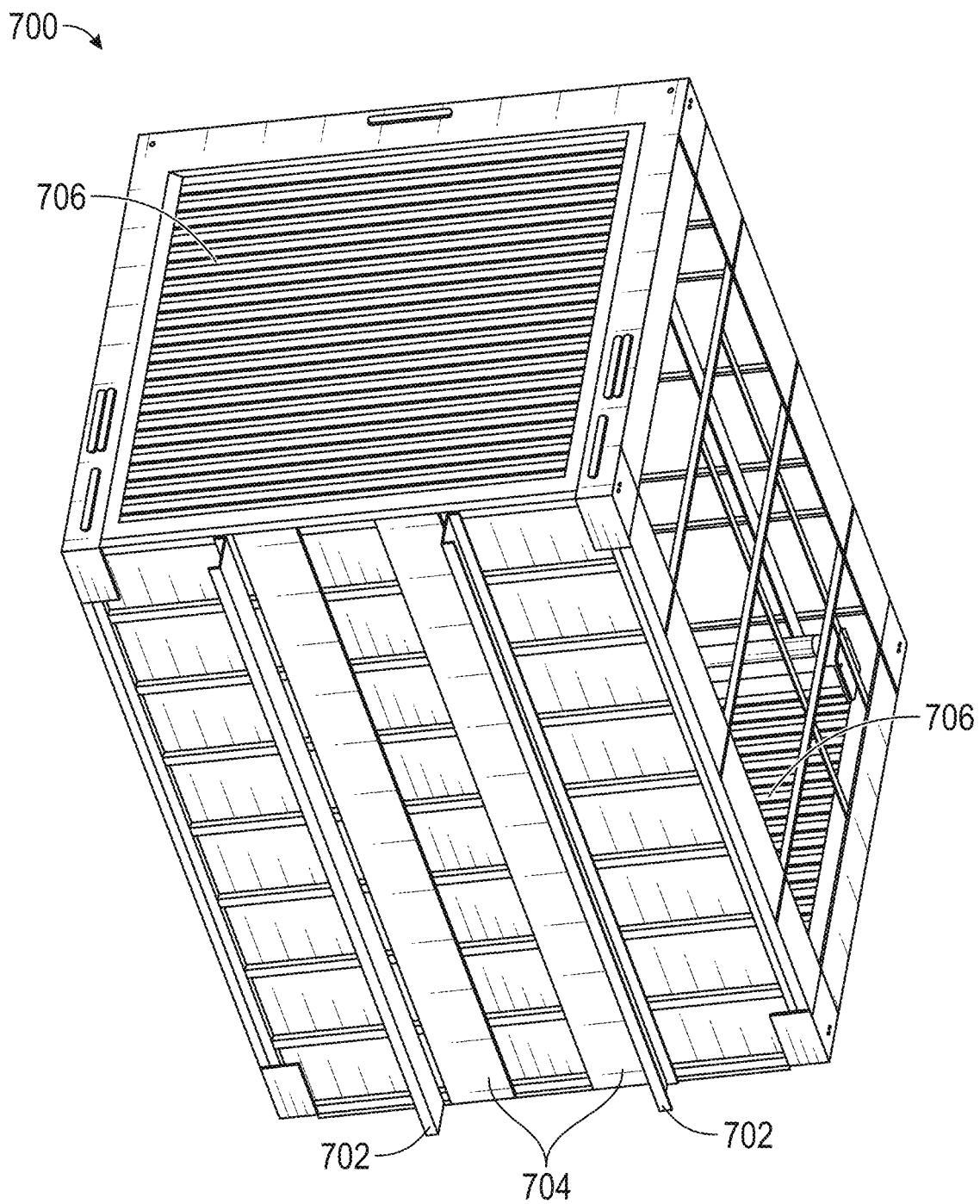
FIG. 15 is a bottom perspective view of an embodiment of a container configured for use with the container transfer system of FIG. 10.

FIG. 15 is a bottom perspective view of an embodiment of a container 700 configured for use with the container transfer system 500 of FIG. 10. As described previously, container rails 702 can be positioned on a bottom surface of the container 700. When the container 700 is positioned on the container transfer system 500, the container transfer system 500 may be received between the container rails 702. The container rails 702 may serve to facilitate alignment between the container 700 and the container transfer system 500. The container 700 may also include container support surfaces 704 on a bottom surface thereof. In some embodiments, the container support surfaces 704 can be configured to provide a flat surface for engaging with the rollers 510 of the container 700. That is, the container support surfaces 704 of the container 700 may ride on the rollers 510 of the container transfer system 500 during conveyance of the container 700 by the conveyance assembly 502.

As shown in FIG. 15, the container 700 may generally comprise an enclosure for receiving and securing cargo. The container 700 may include a door 706 as shown. Further, in FIG. 15, one of the side walls of the container is removed to show that the container 700 may also include a second door 706 on the opposite side of the container. This may allow the contents of the container 700 to be access from either side, which may be particularly advantageous as the accessible end of the container 700 may change as the container 700 is transferred between two vehicles.

Figure 16:
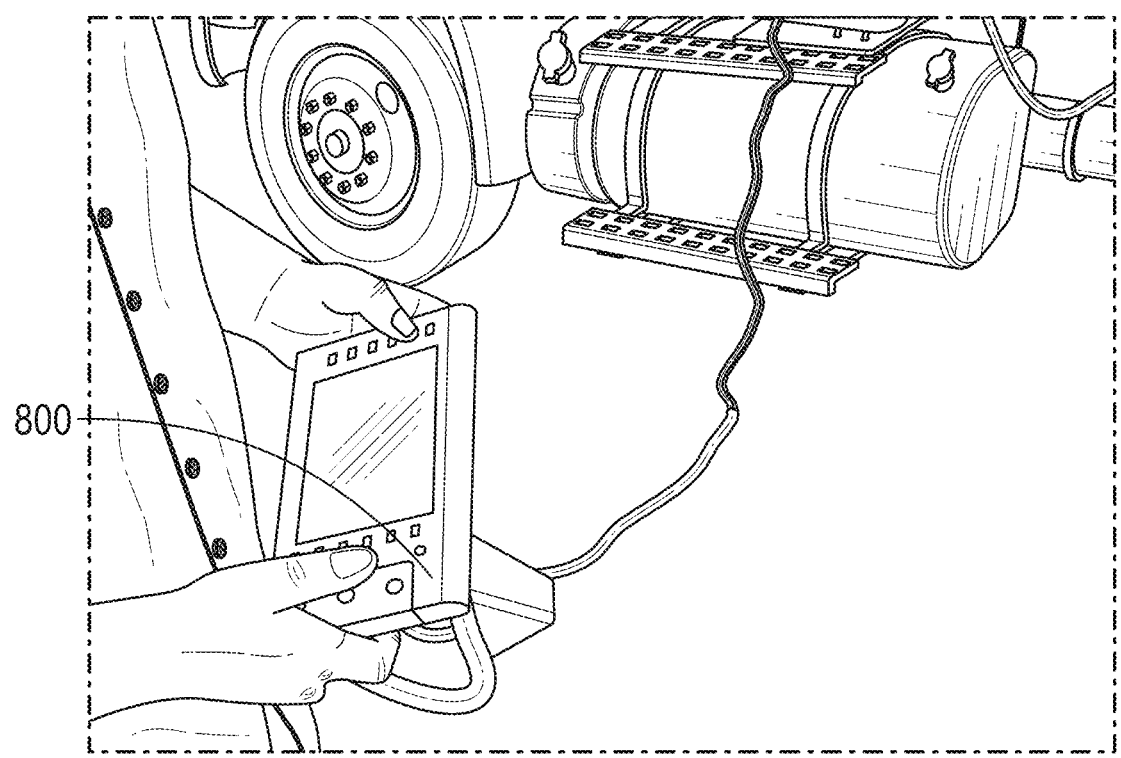
FIG. 16 illustrates an embodiment of a controller configured for use with the container transfer system of FIG. 10.

FIG. 16 illustrates an embodiment of a controller 800 configured for use with the container transfer system of FIG. 10. The controller 800 may be configured to control operation of the conveyance assembly 502, lift assemblies 504, and/or locking assemblies 506. In some embodiments, the controller 800 is configured to provide simplified or "one-touch" transfer control, allowing an operator simply transfer a container 700 between two transfer system 500 without having to specifically level and align the two container transfer systems 500. For example, upon selecting the option to transfer a container 700, one container transfer system 500 may automatically adjust the lift assemblies 504 to level with a second container transfer system 500. The system may then disengage the locking assemblies 506 and activate the conveyance assembly 502 to move the container 700 from the first container transfer system 500 to the second container transfer system 500. In other embodiments, the controller 800 may be used to control each of these functions individually.

FIGS. 17A and 17B are views illustrating the container transfer system 500 of FIG. 10 during use, transferring a container 700 between the container transfer system 500 installed on a vehicle and a container transfer system 500 installed on a rack. As shown in FIG. 17A, the vehicle 700 may be backed to the rack such that the two container transfer systems 500 are longitudinally aligned. The hydraulic system of the vehicle 600 may be connected to the hydraulic components of the container transfer system 500 of the rack using the hydraulic connections 552. As shown in FIG. 17B, the lift assemblies 504 of the container transfer system 500 of the vehicle 600 can be actuated to level the conveyance assembly 502 of the container transfer system 500 of the vehicle 600 with the container transfer system 500 of the rack. The locking assemblies 506 can be released and the container 700 can be transferred to the rack using the conveyance assemblies 502.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes can be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures can be combined, interchanged or excluded from other embodiments.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims. Applicant reserves the right to submit claims directed to combinations and sub-combinations of the disclosed inventions that are believed to be novel and non-obvious. Inventions embodied in other combinations and sub-combinations of features, functions, elements and/or properties can be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

What is claimed is:

1. A container transfer system installed on a vehicle, the container transfer system comprising:
   a conveyance assembly configured to move a container in a substantially horizontal direction along a longitudinal direction of the conveyance assembly, the conveyance assembly comprising:
      a frame comprising longitudinal members and transverse members; and
      a plurality of rollers coupled to the frame, wherein each roller of the plurality of rollers is rotatably coupled to the longitudinal members of the frame by bearings attached to the longitudinal members of the frame, and wherein the plurality of rollers comprise:
         a first set of drivable rollers configured to be actively driven by a motor coupled to the frame, wherein each of the first set of drivable rollers comprises a first roller on a first side, a second roller on a second side, and a sprocket positioned between the first roller and the second roller, the sprocket engaged with a chain that is driven by the motor, and
         a second set of passive rollers; and
   a plurality of lift assemblies coupled between chassis rails of the vehicle and the frame of the conveyance assembly, each of the plurality of lift assemblies comprising a lift actuator configured to be actuated to raise and lower the conveyance assembly in a substantially vertical direction, wherein each of the plurality of lift assemblies is coupled to an inner surface of one of the chassis rails so as to be positioned between the chassis rails, and comprises:
      a bracket comprising a first mounting plate attached to one of the chassis rails of the vehicle and a lift actuator support plate attached to a lower end of the lift actuator; and
      a frame attachment structure attached to an upper end of the lift actuator, the frame attachment structure further comprising a second mounting plate attached to the frame of the conveyance assembly,
      wherein the frame attachment structure further comprises a rail extending along an axis parallel to an axis of actuation of the lift actuator, the rail slidingly engaged with one or more guides attached to the bracket of the lift assembly, wherein during actuation of the lift actuator, the one or more guides slide linearly along a length of the rail.

2. The system of claim 1, wherein the upper end of the lift actuator is attached to the frame attachment structure with a removable pin configured to be removed to detach the lift actuator from the frame attachment structure.

3. The system of claim 1, wherein:
   the vehicle comprises a hydraulic system; and
   the motor comprises a hydraulic motor configured to be driven by the hydraulic system of the vehicle.

4. The system of claim 3, wherein each of the lift actuators comprises a hydraulic ram configured to be driven by the hydraulic system of the vehicle.

5. The system of claim 1, wherein the set of drivable rollers comprises four drivable rollers positioned at a distal end of the conveyance assembly.

6. The system of claim 5, wherein the plurality of lift assemblies comprises four lift assemblies, each of the four assemblies positioned in one of four corners of the frame of the conveyance assembly.

7. The system of claim 6, wherein the lift actuator of each of the four lift assemblies can be independently actuated such that longitudinal and transverse tilt of the conveyance assembly can be adjusted to level the conveyance assembly.

8. The system of claim 1, further comprising a container positioned on the conveyance assembly, the container comprising:
 an enclosure configured for receiving cargo;
 a pair of container rails attached to a bottom surface of the container; and
 one or more container support surfaces attached to the bottom surface of the container between the pair of rails.

9. The system of claim 8, wherein the enclosure of the container comprises a first door on a first end and a second door on a second end, the second end opposite the first end.

10. The system of claim 8, wherein the conveyance assembly is received between the pair of container rails such that container support surfaces rest on the plurality of rollers.

11. The system of claim 10, wherein the motor is configured to drive the set of drivable rollers to convey the container along the longitudinal direction.

12. The system of claim 10, further comprising one or more locking assemblies configured to engage the container to prevent movement of the container when engaged.

13. The system of claim 12, wherein each of the one or more locking assemblies is attached to one of the chassis rails and comprises an actuator configured to actuate a locking pawl that engages a lug on the container.

14. The system of claim 13, wherein the actuator comprises a hydraulic actuator driven by a hydraulic system of the vehicle.

15. The system of claim 1, wherein:
 the vehicle comprises a hydraulic system;
 the motor comprise a hydraulic motor configured to be driven by the hydraulic system of the vehicle;
 each of the lift actuators comprises a hydraulic ram configured to be driven by the hydraulic system of the vehicle; and
 the system comprises hydraulic connectors configured to connect to hydraulic components of a second container transfer system such that the hydraulic components of the second container transfer system can be driven by the hydraulic system of the vehicle.

16. The system of claim 15, wherein the second container transfer system is mounted on a rack.

17. The system of claim 16, further comprising a container configured to be transferred between the container transfer system of the vehicle and the second container transfer system of the rack.

\* \* \* \* \*